(12) United States Patent
Lee et al.

(10) Patent No.: US 11,498,228 B2
(45) Date of Patent: Nov. 15, 2022

(54) METHOD FOR SENSING DEPTH OF OBJECT BY CONSIDERING EXTERNAL LIGHT AND DEVICE IMPLEMENTING SAME

(71) Applicant: LG ELECTRONICS INC., Seoul (KR)

(72) Inventors: Changhyeon Lee, Seoul (KR); Dong Seong Kim, Seoul (KR); Byungkon Sohn, Seoul (KR); Seung In Shin, Seoul (KR); Jungmin Shim, Seoul (KR); Jae Hoon Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 16/622,202

(22) PCT Filed: May 29, 2018

(86) PCT No.: PCT/KR2018/006113
§ 371 (c)(1),
(2) Date: Dec. 12, 2019

(87) PCT Pub. No.: WO2018/230864
PCT Pub. Date: Dec. 20, 2018

(65) Prior Publication Data
US 2020/0122344 A1     Apr. 23, 2020

(30) Foreign Application Priority Data

Jun. 14, 2017 (KR) .................. 10-2017-0075055
Jul. 27, 2017 (KR) .................. 10-2017-0095412

(51) Int. Cl.
*G05B 15/00* (2006.01)
*G05B 19/00* (2006.01)
(Continued)

(52) U.S. Cl.
CPC ........... *B25J 19/023* (2013.01); *B25J 9/1697* (2013.01); *B25J 19/022* (2013.01); *B25J 19/026* (2013.01);
(Continued)

(58) Field of Classification Search
CPC ...... B25J 19/023; B25J 9/1697; B25J 19/022; B25J 19/026; B25J 11/008; G05D 1/02;
(Continued)

(56) References Cited

U.S. PATENT DOCUMENTS 8,482,722 B2  7/2013  Min et al.
8,953,152 B2  2/2015  Min et al.
(Continued)

FOREIGN PATENT DOCUMENTS

KR    10-0903786 B1     6/2009
KR    10-2011-0024242 A  3/2011
(Continued)

*Primary Examiner* — Harry Y Oh
(74) *Attorney, Agent, or Firm* — Birch, Stewart, Kolasch & Birch, LLP

(57) ABSTRACT

The present disclosure relates to a method for sensing the depth of an object by considering external light and a device implementing the same, and a method for sensing the depth of an object by considering external light according to an embodiment of the present disclosure comprises the steps of: storing, in a storage unit, first depth information of an object, which is sensed at a first time point by a depth camera unit of a depth sensing module; storing, in the storage unit, second depth information of the object, which is sensed at a second time point by the depth camera unit; comparing, by a sensing data filtering unit of the depth sensing module, the generated first and second depth information to identify a filtering target region from the second depth information;
(Continued)

and adjusting, by a control unit of the depth sensing module, the depth value of the region filtered from the second depth information.

10 Claims, 27 Drawing Sheets

(51) Int. Cl.
  *B25J 19/02* (2006.01)
  *G06T 7/50* (2017.01)
  *H04N 13/128* (2018.01)
  *B25J 9/16* (2006.01)
  *G05D 1/02* (2020.01)

(52) U.S. Cl.
  CPC .............. *G05D 1/02* (2013.01); *G06T 7/50* (2017.01); *H04N 13/128* (2018.05); *G06T 2207/10028* (2013.01)

(58) Field of Classification Search
  CPC ...... G05D 1/0246; G05D 1/0274; G06T 7/50; G06T 2207/10028; G06T 5/50; G06T 2207/20221; H04N 13/128; H04N 2213/003; H04N 13/271; H04N 5/235
  See application file for complete search history.

(56) References Cited

U.S. PATENT DOCUMENTS

| | | | |
|---|---|---|---|
| 9,746,547 B2* | 8/2017 | Kim | G01S 17/36 |
| 2008/0205748 A1 | 8/2008 | Lee et al. | |
| 2012/0242975 A1* | 9/2012 | Min | G01S 17/894 356/5.03 |
| 2012/0253582 A1* | 10/2012 | Chrysanthakopoulos | G05D 1/0274 701/25 |
| 2015/0092019 A1* | 4/2015 | Asano | H04N 5/37213 348/136 |
| 2018/0266834 A1 | 9/2018 | Cronin et al. | |

FOREIGN PATENT DOCUMENTS

| | | |
|---|---|---|
| KR | 10-2012-0108383 A | 10/2012 |
| KR | 10-2017-0015114 A | 2/2017 |

* cited by examiner

FIG. 3

| 123 | 123 | 123 | 124 | 123 | 123 |
| 123 | 123 | 123 | 124 | 123 | 123 |
| 557 | 557 | 559 | 600 | 641 | 685 |
| 123 | 123 | 123 | 124 | 123 | 123 |

15a — 11

| 124 | 124 | 124 | 125 | 124 | 124 |
| 124 | 124 | 124 | 125 | 124 | 124 |
| 558 | 558 | 560 | 601 | 642 | 686 |
| 124 | 124 | 124 | 125 | 124 | 124 |

15b — 12

| 125 | 125 | 125 | 126 | 125 | 125 |
| 125 | 125 | 125 | 126 | 125 | 125 |
| 559 | 795 | 561 | 602 | 643 | 687 |
| 125 | 125 | 125 | 126 | 125 | 125 |

15c — 13

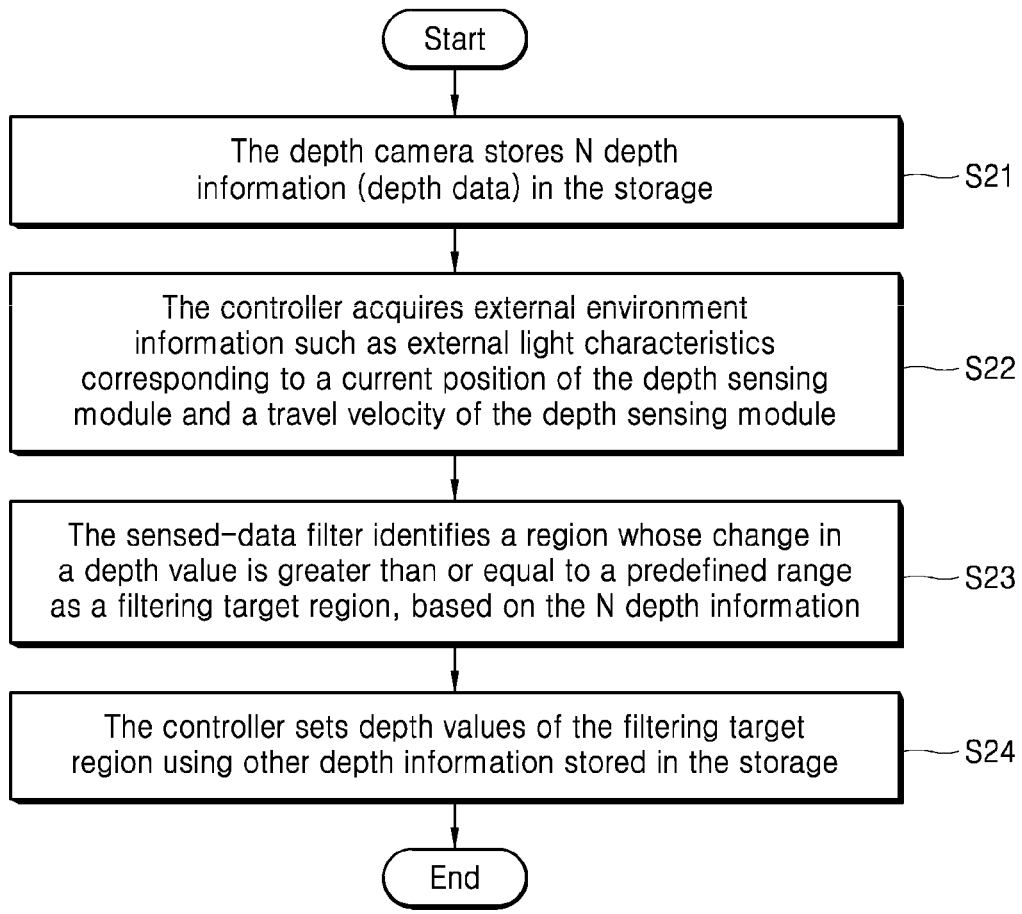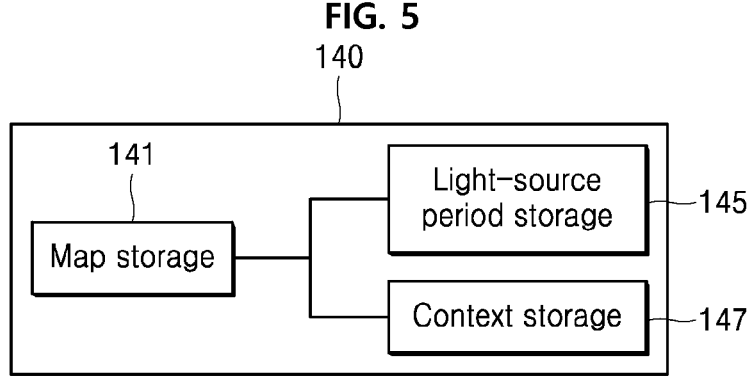

FIG. 7

| Light | Pos | Day | Time |
|---|---|---|---|
| L1 | ALL | Mon-Fri | 06:00~22:30 |
| L3 | ALL | Sat, Sun | 10:00~17:00 |

145a

| Light | Pos | Off | On |
|---|---|---|---|
| L1 | 7, 17 | Sunny_Weather | Night / Rainy_weather |
| L3 | ALL | Sat, Sun | Crowded |

147a

FIG. 12
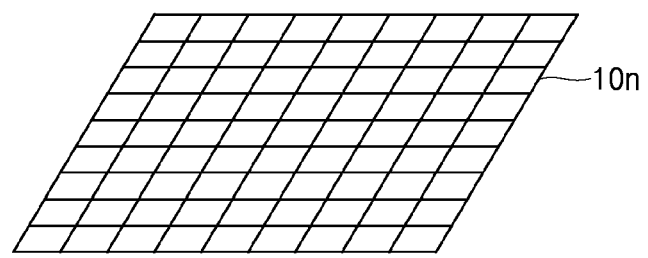
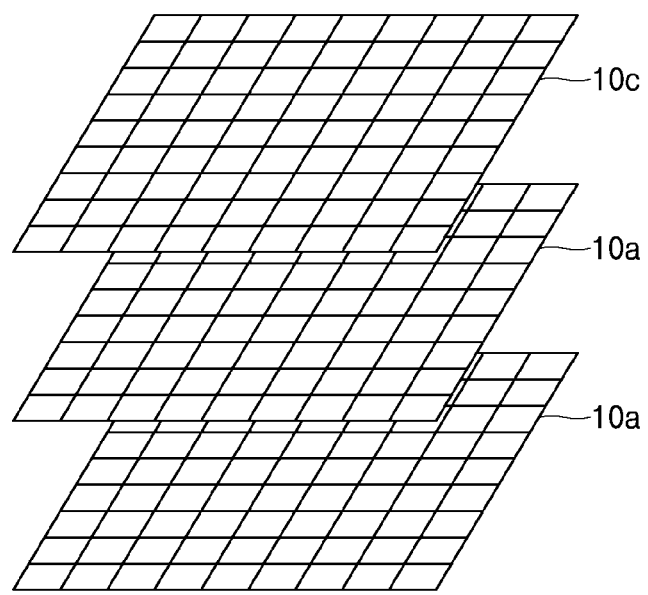

FIG. 14

| | DCell1 | DCell2 | | |
|---|---|---|---|---|
| 100 | 90 | 80 | 80 | 90 |
| 100 | 90 | 80 | 80 | 90 |
| 100 | 90 | 120 | 80 | 90 |

10p

| | DCell1 | DCell2 | | |
|---|---|---|---|---|
| 90 | 80 | 71 | 70 | 80 |
| 90 | 80 | 71 | 70 | 80 |
| 90 | 80 | 111 | 70 | 80 |

10q

| | DCell1 | DCell2 | | |
|---|---|---|---|---|
| 79 | 68 | 61 | 60 | 70 |
| 79 | 0 | 0 | 60 | 70 |
| 79 | 68 | 103 | 60 | 70 |

10s

⇒

FilteringArea

| | | | | |
|---|---|---|---|---|
| 79 | 68 | 61 | 60 | 70 |
| 79 | 70 | 62 | 60 | 70 |
| 79 | 68 | 103 | 60 | 70 |

10s'

FIG. 26
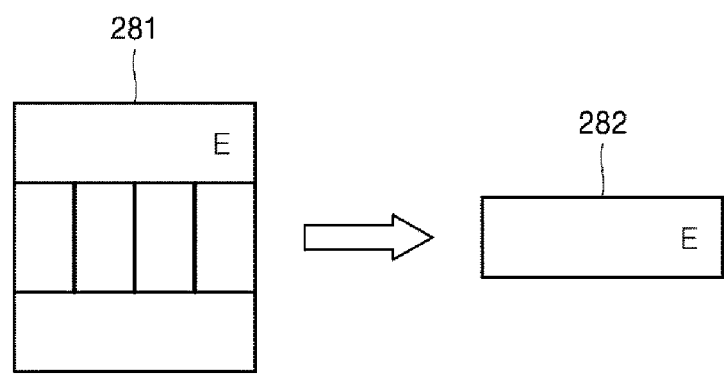
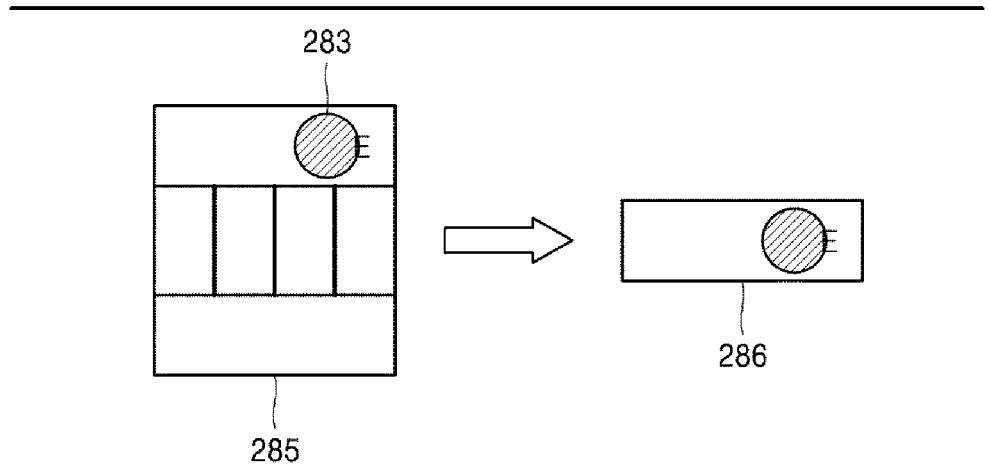

FIG. 27

| Serial | Pos | Direction | LI | Feature Set |
|---|---|---|---|---|
| 1 | (5, 11) | N | Normal | E |
| 2 | (9, 3) | S | Normal | 3 |
| 3 | (16, 5) | NE | Normal | M-D<br>C-A |
| 4 | (5, 11) | N | Bright | ⊘ E |

METHOD FOR SENSING DEPTH OF OBJECT BY CONSIDERING EXTERNAL LIGHT AND DEVICE IMPLEMENTING SAME

CROSS-REFERENCE TO RELATED APPLICATIONS

This application is the National Phase of PCT International Application No. PCT/KR2018/006113 filed on May 29, 2018, and claims priority benefit under 35 U.S.C. § 119(a) to Patent Application No. 10-2017-0075055, filed in the Republic of Korea on Jun. 14, 2017, and to Patent Application No. 10-2017-0095412, filed in the Republic of Korea on Jul. 27, 2017, all of which are hereby expressly incorporated by reference into the present application.

FIELD

The present disclosure relates to a method for sensing a depth of an object based on external light and a device for implementing the same.

DESCRIPTION OF RELATED ART

In order to operate a robot in a space where movements of people and objects are actively occurring, such as airports, schools, government offices, hotels, company offices, factories, gymnasiums, and cultural facilities such as performance halls, the robot should continuously sense the space and travel while avoiding objects and people. In this process, the robot may identify a travel route based on various information as sensed during travelling. In this connection, external light (based on a lighting device or sun-light) may illuminate the space in which the robot travels and may affect a sensing result of an object as detected by the robot.

In particular, a depth sensing module (depth camera) that acquires depth information, a depth sensing device equipped with such a module, or a vision RGB camera provides a distance to an external object as 3D image information or a surrounding image as 2D image information. This process may be subjected to external lighting derived from strong lighting devices or sun-light. In particular, when an object reflects external light, a problem arises in that a distance to the external object is sensed to be larger or smaller than it actually is.

This may occur frequently in a space where movements of people and objects are actively occurring, such as airports, schools, government offices, hotels, company offices, factories, gymnasiums, and cultural facilities such as performance halls. In this space, a window for introducing external light into an indoor space is large or a brightness of a lighting device in the indoor space is strong. Further, even when the robot travels in an external space, distortion related to image acquisition using a depth/RGB camera may occur depending on external sun-light or light reflected sun-light from an object. Therefore, in order to solve this problem, the present disclosure proposes a method of reflecting a state of the external light or filtering the external light in a process of sensing a depth image or a RGB image of the object.

DISCLOSURE

Technical Purposes

The present disclosure solves the above problem. One purpose of the present disclosure is to provide a method and device for correcting distortion of depth-sensed information due to strong external light.

Further, another purpose of the present disclosure is to provide a method and device for enhancing accuracy of depth sensed information using spatial and temporal information about a space and timing in which strong external light may occur.

Further, still another purpose of the present disclosure is to provide a method and device for increasing accuracy of the above-described depth sensed information such that a robot may travel safely.

Further, still another purpose of the present disclosure is to provide a method for controlling an operation of a depth camera or a vision camera that senses an image based on strong sun-light to prevent distortion of image information, and a robot implementing the same.

Further, yet still another purpose of the present disclosure is to provide a method for improving accuracy in sensing image information using spatial and temporal information about a space and timing in which strong external light may occur, and a robot implementing the same.

In addition, yet still another purpose of the present disclosure is to provide a method for improving accuracy in sensing image information by adaptively controlling a depth camera and a vision camera based on detected illuminance information, and a robot implementing the same.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

Technical Solutions

One embodiment of the present disclosure provides a method for sensing a depth of an object based on an effect of external light, the method comprising: storing, by a depth camera of a depth sensing module, first depth information of an object sensed at a first time-point into storage; storing, by the depth camera, second depth information of the object sensed at a second time-point into the storage; comparing, by a sensed-data filter of the depth sensing module, the generated first depth information and second depth information with each other and identifying, by the filter, a filtering target region in the second depth information; and adjusting, by a controller of the depth sensing module, a depth value of the filtering target region in the second depth information.

Another embodiment of the present disclosure provides a depth sensing module comprising: storage for storing depth information therein; a depth camera for generating first depth information of an object at a first time-point and generating second depth information of the object at a second time-point, wherein second time-point is previous or subsequent to the first time-point; a sensed-data filter for comparing the generated first depth information and second depth information with each other and for identifying a filtering target region in the second depth information; and a controller configured to change a depth value of the filtering target region in the second depth information or to remove the second depth information from the storage.

Still another embodiment of the present disclosure provides a moving robot for sensing a depth of an object based on an effect of external light, the robot comprising: a depth sensing module including: storage for storing depth information therein; a depth camera for generating first depth information of an object at a first time-point and generating second depth information of the object at a second time-point, wherein second time-point is previous or subsequent to the first time-point; a sensed-data filter for comparing the generated first depth information and second depth information with each other and for identifying a filtering target region in the second depth information; and a controller configured to change a depth value of the filtering target region in the second depth information or to remove the second depth information from the storage; an object sensing module for sensing an object around the robot; a driver for moving the robot; and a robot controller configured to identify an object around the robot based on sensed results from the depth sensing module and the object sensing module, and to control a travel route of the robot based on the identified object.

Yet still another embodiment of the present disclosure provides a robot for adjusting a sensed image based on a sensed illuminance, the robot comprising: a sensing module including a depth camera or vision camera, and an illuminance sensor, wherein the illuminance sensor senses a illuminance in a direction in which the depth or vision camera senses an image; a map storage for storing, therein, information of an object placed in a space where the robot travels; a controller configured: to combine a illuminance sensed by the illuminance sensor with at least one of object information stored in the map storage, object information sensed by the sensing module, or position information and time information of the robot; and to determine, based on the combination, whether to activate an image control process using the depth camera or the vision camera; and a driver configured to move the robot.

Yet still further embodiment of the present disclosure provides a method for adjusting a sensed image based on a sensed illuminance, the method comprising: sensing, by an illuminance sensor of a sensing module, an illuminance in a direction in which a depth camera or vision camera senses an image; combining, by a controller, a illuminance sensed by the illuminance sensor with at least one of object information stored in a map storage, object information sensed by the sensing module, or position information and time information of the robot; and determining, by the controller, based on the combination, whether to activate an image control process using the depth camera or the vision camera, wherein the image control process includes filtering depth information sensed by the depth camera or selecting a feature set of color information sensed by the vision camera.

Technical Effects

In accordance with the embodiments of the present disclosure, when the depth camera is used outdoors, in a space into a large amount of sun-light or light from a lighting device is introduced, or in an environment where sun-light is reflected, and thus, the depth camera senses a depth value incorrectly, the incorrected depth value may be filtered to generate correct depth information.

Further, in accordance with embodiments of the present disclosure, the controller may identify whether to filter the depth value based on information on whether the external light such as the lighting device or sun-light occurs depending on a current position and situation, thereby to increase the filtering rate.

Further, in accordance with embodiments of the present disclosure, when the depth camera or vision camera is used outdoors, in a space into a large amount of sun-light or light from a lighting device is introduced, or in an environment where sun-light is reflected and is used to acquire depth or color information, the depth camera or vision camera may sense correct depth information or correct color information based on the illuminance situation, or calculate a correct feature set based on the illuminance situation.

Further, in accordance with embodiments of the present disclosure, the robot may determine whether to filter the depth value or whether to select the feature set of color information to perform the vision SLAM, based on information on whether external light such as a lighting device or sun-light occurs. This may increase the accuracy of the obstacle determination and SLAM operation.

Effects of the present disclosure are not limited to the above effects. Those skilled in the art may readily derive various effects of the present disclosure from various configurations of the present disclosure.

BRIEF DESCRIPTION OF DRAWINGS

FIG. 2 and FIG. 3 illustrate a configuration of depth information according to an embodiment of the present disclosure.

FIG. 4 illustrates a process in which a depth sensing module processes depth information according to an embodiment of the present disclosure.

FIG. 5 illustrates a configuration of a light information provider of a depth sensing module according to an embodiment of the present disclosure.

FIG. 7 illustrates a configuration of each of light-source period storage and context storage according to an embodiment of the present disclosure.

FIG. 11 and FIG. 12 illustrate a process in which a depth sensing module senses a depth value of an object based on an effect of external light according to an embodiment of the present disclosure.

FIG. 14 illustrates an example of newly generating and storing depth information according to an embodiment of the present disclosure.

FIG. 26 is a diagram in which a controller identifies color information of a vision camera based on illuminance according to an embodiment of the present disclosure.

FIG. 27 shows information of feature sets stored in storage 150 according to another embodiment of the present disclosure.

DETAILED DESCRIPTIONS

Figure 1:
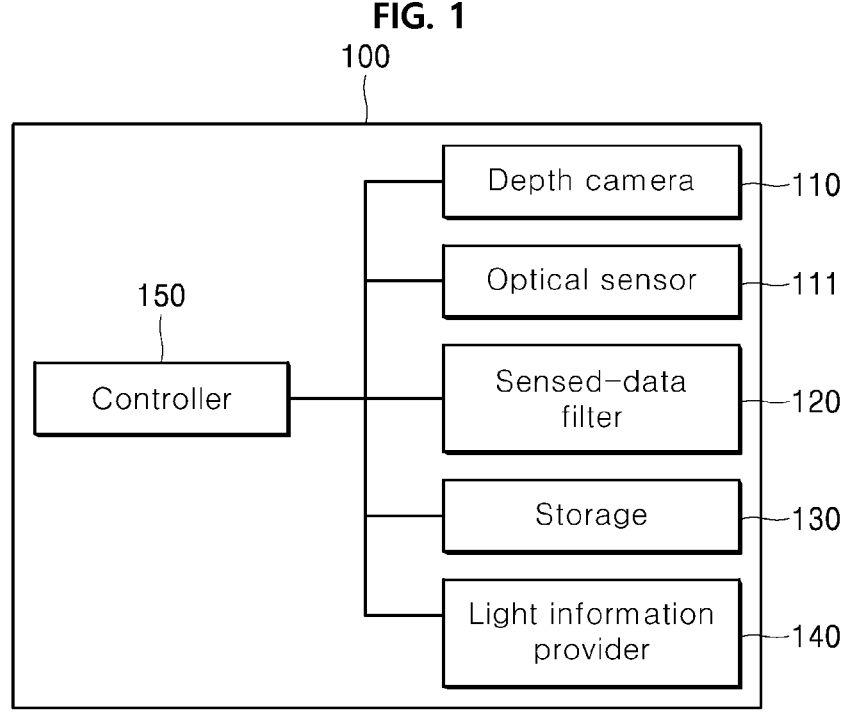
FIG. 1 illustrates a configuration of a depth sensing module according to an embodiment of the present disclosure.

Hereinafter, exemplary embodiments of the present disclosure will be described in detail with reference to the accompanying drawings so that those skilled in the art may easily implement the present disclosure. The present disclosure may be embodied in many different forms and should not be construed as limited to the embodiments set forth herein.

In order to clarify the present disclosure, the present disclosure has omitted components not related to the description. Like reference numerals designate like or similar components throughout the specification. Further, the embodiments of the present disclosure will be described in detail with reference to exemplary drawings. In allocating reference numerals to components of each drawing respectively, the same component may have the same reference numeral even though the same component is displayed on different drawings. Further, well-known methods, procedures, and components have not been described in detail so as not to unnecessarily obscure aspects of the present disclosure.

It will be understood that, although the terms "first", "second", "third", A, B, (a), (b), and so on may be used herein to describe various elements, components, regions, layers and/or sections, these elements, components, regions, layers and/or sections should not be limited by these terms. These terms are used to distinguish one element, component, region, layer or section from another element, component, region, layer or section. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may be present.

Further, in implementation of the present disclosure, for convenience of explanation, a single component may be divided into sub-components. In this connection, components may be implemented in a single device or module. Alternatively, a single component may be divided into sub-components which are distributed in multiple devices or modules respectively.

Hereinafter, as used herein, a depth sensing module refers to a device acquiring depth image information of an object and calculating a distance to the object in a space where a moving apparatus having the depth sensing module mounted thereon, for example, a robot travels. The depth sensing module may be referred to as a depth sensing device when the depth sensing module is embodied as an independent device instead of being mounted on an apparatus.

Further, as used herein, the robot having the depth sensing module mounted thereon has a specific purpose such as cleaning, security, monitoring, and guidance, or provides a service based on characteristics of a space wherein the robot travels and includes a driver to move the robot. Therefore, as used herein, a robot collectively refers to an apparatus having a driver to move the robot based on predefined information and sensing results and providing a predefined service. As used herein, a sensing module may include the depth sensing module as described above, and may include various types of sensors for sensing a presence, distance, characteristic, and the like of an external object.

In accordance with the present disclosure, the robot may travel based on a map. The map may include information about a stationary object, such as a fixed wall or staircase as identified as not moving in a space. Further, information about moving objects as arranged periodically may be stored on the map. In an embodiment, information on obstacles disposed within a predefined range in a progress direction of the robot may be stored on the map.

In one example, the robot may store information about external light such as sun-light and light from a lighting device on the map. For example, when strong external light such as sun-light is present in a specific time range or in a specific situation, or when external light occurs due to activation of a specific lighting device at specific time, the robot may store information about the external light on the map. The information about the external light includes information about a direction in which the light is incident, a light intensity, the time, or a period. The storing of the information about the external light on the map as above-described may be applied to both the robot and the depth sensing module.

Hereinafter, a method and a device for correcting distortion of depth sensed information due to strong external light will be described in FIGS. 1 to 17.

Further, FIG. 18 to FIG. 30 provide a method of controlling an operation of a depth camera or a vision camera that senses an image to prevent distortion of image information due to strong sun-light, and a robot implementing the same.

FIG. 1 illustrates a configuration of a depth sensing module according to an embodiment of the present disclosure. The depth sensing module includes a depth camera 110 which first generates depth information of an external object, a sensed-data filter 120 which identifies a filtering target region from the first generated depth information, storage 130 in which the depth information is stored, and a controller 150 for applying previous or subsequent depth information to the filtering target region to generate new depth information.

Further, the depth sensing module may further include a light information provider 140 that provides characteristic information of external light at a position where the depth sensing module is positioned. The light information provider 140 may provide light information at a current position or a subsequent position based on a position or travel velocity of the depth sensing module 100. In addition, an optical sensor 111 for sensing external light may be disposed thereon. The optical sensor 111 may update or store intensity or other characteristics of light as sensed during travelling on the light information provider 140.

More specifically, the depth camera 110 generates first depth information of an object at a first time-point and second depth information of the object at a second time-point that precedes or follows the first time-point and store the first and second depth information on the storage 130.

Further, the sensed-data filter 120 compares the first depth information and the second depth information with each other and identifies a filtering target region in the second depth information based on the comparison result. The identification of the filtering target region will be described later. Further, the controller 150 may change a depth value of the filtering target region in the second depth information or remove the second depth information from the storage 130 so that the depth information may be accurately calculated.

In FIG. 1, when the depth sensing module is not a single device but a device coupled to an apparatus, for example, a robot, some components thereof may be implemented in the robot. For example, the light information provider 140 may be included in the depth sensing module 100 or may be included in the robot as an apparatus having the depth sensing module 100 mounted thereon. In the latter case, the controller 150 may receive the light information and position information from the robot and may supply the same to the sensed-data filter 120 back or may use the same to generate new depth information free of an effect of the external light.

In an embodiment of the present disclosure, the depth sensing module sequentially stores depth information in the storage 130 in a queue manner for a predefined time period and determines specific depth information strongly affected by the external light among the stored depth information as a garbage value and does not use the specific depth information. This process may reflect a travel velocity at which the depth sensing module moves, for example, a travel velocity of the depth sensing module or a travel velocity of the robot equipped with the depth sensing module.

Figure 2:
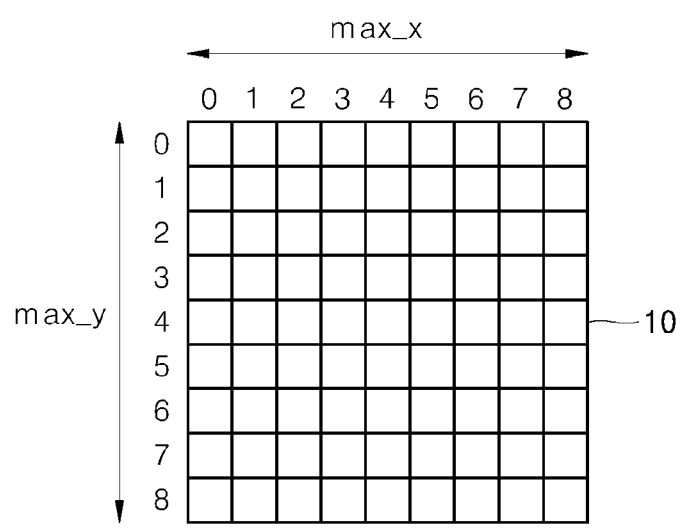

FIG. 2 and FIG. 3 illustrate a configuration of depth information according to an embodiment of the present disclosure. Depth information 10 means depth cell-based depth values of a depth image captured in one frame which are stored separately. Further, the depth information 10 is stored in the storage 130. Further, a plurality of depth information corresponding to a plurality of time frames captured at a plurality of different time-points may be stored in the storage 130.

In an embodiment, the depth information may be composed of each depth value of each x-y coordinate of an image captured at a specific time-point. For example, the depth camera 110 may calculate each depth value in each of depth cells having a total number of a horizontal size max_x and a vertical size max_y in a depth image of a specific time-point, that is, at a specific frame. In one embodiment, each cell in the depth image may correspond to one pixel. A depth cell may include a pixel or greater. A single depth value is calculated on a depth cell basis. A size of the depth cell may increase or decrease depending on a resolution of the depth image produced by the depth camera 110. A number at a top of the depth information 10 indicates an x coordinate while a number at a left side thereof indicates a y coordinate.

One depth cell has one depth value. Therefore, a value of one depth cell defined using the x and y coordinates may be expressed as follows.

Depth Value: 61.3 (X: 15, Y: 25): Frame Number: 52

The frame number may act as identification information for identifying one depth image. The depth value represents a depth value of a depth cell indicated by X and Y at a specific frame.

As shown in FIG. 3, depth information of a depth image at each frame as generated by the depth camera 110 may continue to change over time. In one embodiment, a depth value of a specific depth cell constituting the depth information may continue to change over time. In one embodiment, a depth value of a depth cell 15a, 15b, and 15c indicated by x: 1 and y: 2 may change as a frame changes. In another example, a depth value of another depth cell may change over time. Briefly, depth information refers to a set of depth values constituting a depth image acquired by the depth sensing module 100 at a single frame, that is, captured at a single time-point.

As shown in FIG. 3, each of depth values of all of depth cells increases by one between depth information 11 of a first frame and depth information 12 of a second frame. On the contrary, it may be seen that there is a large difference between a depth value of a depth cell indicated by x: 1 and y: 2 of the depth information 12 of the second frame and a depth value of a depth cell indicated by x: 1 and y: 2 of depth information 13 of a third frame.

That is, a depth value 15a of a depth cell indicated by x: 1 and y: 2 at the first frame is 557, a depth value 15b of a depth cell indicated by x: 1 and y: 2 at the second frame is 558, and a depth value 15c of a depth cell indicated by x: 1 and y: 2 at the third frame is 795. Each of the depth values of other depth cells excepted for the depth cell indicated by x: 1 and y: 2 is increased by 1 uniformly between the three frames. Thus, the controller 150 of the depth sensing module 100 may determine the depth value 15c as a garbage value due to the external light.

The sensed-data filter 120 or the controller 2900, which will be described later, may analyze a specific depth value among accumulated depth information whose change is greater than a pre-defined reference value, and determine whether the changed specific depth value is a garbage value due to influence of the external light. Then, if so, the sensed-data filter 120 or the controller 2900 may extract the specific depth value from depth information of a previous or subsequent depth image, that is, from a depth image of a previous frame or a subsequent frame. Then, the sensed-data filter 120 or the controller 2900 may correct the specific depth value such that the garbage value due to the external light may be removed. Thus, depth information reflecting a correct depth value of an object may be calculated.

Further, a great change in a depth value may be due to sudden appearance of an actual object. Thus, the light information provider 140 provides information needed to determine whether the large change in the depth value is due to a garbage value. Thus, the sensed-data filter 120 may filter the change in the depth value of a depth cell based on the information.

FIG. 4 illustrates a process of filtering a depth value in depth information in a process in which a depth sensing module accumulates and stores depth information according to an embodiment of the present disclosure. FIG. 4 shows that the depth sensing module senses N depth information for a predefined time period, and identifies a depth value having an error due to influence of the external light from the depth information, and then corrects or eliminates the depth value having the error.

The depth camera 110 as a depth sensor stores N depth information (depth data) in the storage S21. For example, N may be a natural number equal to or larger than 1. For example, five depth information may be stored in the storage 130 in a queue manner.

In one example, the controller 150 acquires external environment information such as external light characteristics corresponding to a current position of the sensing module and a travel velocity of the depth sensing module S22. The controller 150 may obtain the external environment information via the light information provider 140 or from another device, such as a robot, to which the depth sensing module 100 is coupled.

The sensed-data filter 120 identifies a region whose change in a depth value is greater than or equal to a predefined range as a filtering target region, based on the external environment information S23. For example, the sensed-data filter 120 examines five queues and compares depth cell-based depth values of the depth information with each other. When the depth value changes between adjacent frames by a predefined distance (for example, 100 mm), the depth value is determined as a garbage value and is not used.

Further, the filter 120 may identify regions having large changes in depth values as filtering target regions. The above-mentioned reference distance may be calculated in consideration of the travel velocity and depth information of the depth sensing module. For example, when assuming that the travel velocity of the robot equipped with the depth sensing module is 500 mm/s and a human travel velocity is 1000 mm/s, a distance 1500 mm between the person and robot may occur in one second. In this connection, when the depth camera 110 generates depth information at a 33 mm/s rate, this means that the depth camera generates depth information about 30 times per second. This is because 1500 mm/30=about 50 mm/frame.

Therefore, when depth information of a single current frame is compared with depth information of a previous frame or a subsequent frame, a difference between depth values between the single current frame and previous frame or subsequent frame may not be larger than 50 mm. Thus, when a change in the depth value is large, the sensed-data filter 120 may determine that the changed depth value is not a depth value of an object but the depth value has changed due to the intensity of the external light. In other words, when a depth value changes by an amount larger than a predefined amount between adjacent time frames, it may be determined that the depth value of the object has changed due to the external light.

Further, in order to increase the sensing accuracy, the controller 150 may determine whether a space where the depth sensing module 100 is positioned is affected in a considerable manner by sun-light or a lighting device and may provide the determination result to the sensed-data filter 120. In this case, when the depth sensing module 100 or the robot equipped with the depth sensing module 100 is positioned at a specific place and/or at a specific time, the depth value affected by the external light may be filtered. Thus, this may eliminate an effect of the external light from the depth value. Thus, the robot may identify an external obstacle during the robot's travelling based on a correct sensing result of the depth value, thereby to prevent delay of the robot travel due to inefficient obstacle detection.

Thereafter, the controller 150 may set depth values of depth cells constituting the filtering target region using other depth information stored in the storage 130 S24.

FIG. 5 illustrates a configuration of a light information provider constituting a depth sensing module or a robot equipped with a depth sensing module according to an embodiment of the present disclosure. The light information provider 140 may be configured to identify the external environment information needed to remove a garbage value from the depth information sensed by the depth sensing module 100. The light information provider 140 may provide information about light reflection and light emission in a space in which the depth sensing module travels. Further, when the external light sensed during travelling has a predetermined intensity or greater and external light is sensed periodically, the depth sensing module 100 may update information about the external light in the light information provider 140.

Main components may include map storage 141 where a position of a stationary object having depth information in a space and reflection or transmission of external light in the space are stored, light-source period storage 145 for storing period information at which the external light is turned on or off, and context storage 146 for storing a context in which the external light is turned on or off.

The map storage 141 stores information about positions of walls, windows, and light-sources in a space in which the depth sensing module 100 travels. In particular, a position of the wall in the space may be stored together with information about reflectance of the external light therefrom so that the depth sensing module 100 may process the depth information based on an intensity of the reflected light. The position of the light source may be stored together with a light intensity of the light source, for example, illuminance, and a light color of the light source. When there is spacing between walls in the space, the spacing may be considered as a glass. A light transmittance of the glass may be stored in the map storage 141.

The light-source period storage 145 may store therein information about a period during which a specific light-source is turned on and off. For example, a light source may be turned on all day or every day. Further, other light sources may only be turned on in the afternoon or in the evening. The light-source period storage 145 stores information about a period at which the light source is turned on and off. Thus, the depth sensing module 100 may determine that there is no influence of the external light when the light source is turned off.

The context storage 147 stores therein context information that is not included in the period information of the light source. The context information may include context information about a situation in which the light source is turned on or off, or context information where sun-light enters the space through a window. In one embodiment, the context information where sun-light enters the space through a window may include information associated with seasons or weather. Further, when a light-source in a space is turned on or off based on a specific condition, context information about the specific condition may be stored in the context storage 147. For example, when the space is an airport, an on/off condition of a light source that is turned on or off based on a specific flight schedule may be stored in the context storage 147. Alternatively, an on/off condition of the light source that is turned on or off based on a specific weather may be stored in the context storage 147.

Therefore, the depth sensing module 100 may identify the information about the light-source in a space where the module 100 currently travels, and whether the light-source is turned on or off, and may remove the garbage value from the depth information based on the identification result.

Figure 6:
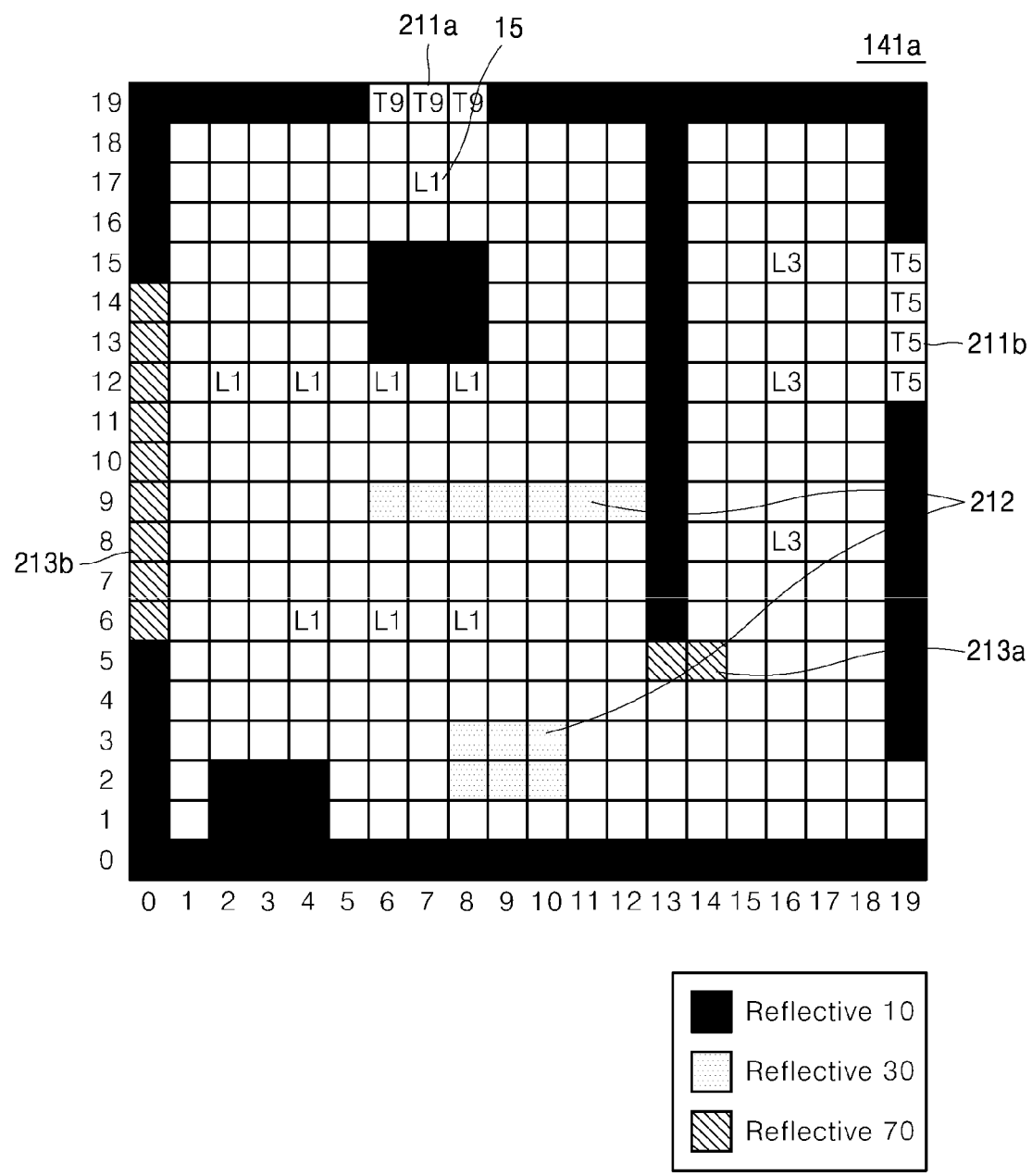
FIG. 6 illustrates a configuration of map storage according to an embodiment of the present disclosure.

FIG. 6 illustrates a configuration of map storage according to an embodiment of the present disclosure.

A map storage 141a may be configured in a bitmap manner. The map storage may be configured such that each bit in a bitmap of an image file represents one unit region. A left bottom unit region may define (0, 0) while a right top unit region defines (19, 19). Further, the map storage 141a in FIG. 6 may have a 20×20 data structure. For example, information about whether an object is present at each position may be included in the data structure. Information may be arranged in a matrix manner. When a stationary object is disposed in unit region, a value of the corresponding unit region may be set to a predefined value.

Further, the map storage 141a may store characteristic information about reflective or transmissive properties of the stationary objects. The characteristic information about the object may be classified based on categories and stored in the map storage 141a. In the map storage 141a in FIG. 6, a black area shows that a light reflectance value of an object is 10, thus, a reflective property of light of the object is low.

Other stationary objects as indicated by 212 have a light reflectance of 30 and thus reflect the external light by 30%. Stationary objects as indicated by 213a and 213b have a light reflectance value of 70 and reflect the external light by 70%. A category of the light reflectance of stationary objects may be defined in various ways. The present disclosure is not limited thereto.

In one example, a combination of T and number in a unit region indicates a transmittance of a stationary object therein. For example, "T9" indicated by 211a indicates that a stationary object made of a transparent material that transmits 90% or greater of light, for example, a transparent glass window is disposed in a corresponding unit region. As a result, when the depth sensing module 100 travels toward a region 211a when the sun rises, the depth sensing module 100 may identify that sun-light affects calculation of depth information.

"T5" indicated by 211b means that a stationary object made of translucent material, for example, a translucent glass window which transmits 50% of light is disposed in a unit region.

L1 or L3 on the map storage 141a indicates a point where a lighting device may be placed or a space in which light may be emitted from a ceiling. L1 or L3 could be a label categorizing a ceiling window or a lighting device. In one embodiment, L1 or L3 may be an illuminance of a lighting device, a light intensity related to a window transmittance, or a group name of lighting devices in a specific category.

When L1, L3, or etc. indicates an intensity of sun-light incident through the ceiling window or an illuminance of the lighting device, L may be defined based on a category. In one embodiment, L may be defined to be 1 to 5 based on a category. In an embodiment of FIG. 6, external light L1 has an intensity corresponding to a category "1". External light L3 has an intensity corresponding to a category "3".

In one embodiment, when the ceiling is made of a transparent glass, the ceiling may be categorized as having a high transmittance. When the ceiling is made of an opaque glass, the ceiling may be categorized as having a low transmittance.

In another embodiment, in addition to the intensity of the external light or the illuminance of the lighting device, lighting devices may be grouped and categorized. For example, lighting devices that are turned on or off at the same time may be grouped and categorized to have a label L1 or L2.

L1 and L3 provide specific information of external light such as an intensity of sun-light incident through a window of a ceiling, a group of a lighting device, or a illuminance of a lighting device, whereas more detailed external light information, such as a time when the sun-light shines or a context (weather, latitude, longitude, etc.) in which the sun-light shines, an on/off period at which the lighting device is turned on and off, or a context in which the lighting device is turned on and off (e.g., a condition in which the lighting device is turned on) may be stored in the light-source period storage 145 and the context storage 147 in FIG. 7.

In FIG. 6, information about a reflectance level at which a material of a floor reflects light may be stored in the map storage 141. For example, as shown in a table below, information about a reflectance level of the floor may be stored in each specific region of the map storage 141a.

TABLE 1

| Positions | Reflective |
|---|---|
| (0, 0) to (19, 19) | Reflective 50 |

In the table 1, (0, 0) defines a left-bottom region while (19, 19) defines a right-top region. Regions corresponding to (0, 0) to (19, 19) may correspond to a category "50". Thus, information indicating that light may be reflected from the floor may be considered in a process of filtering a depth value sensed by the depth sensing module 100. Alternatively, a space may be subdivided as follows, and reflection information of the floor may be presented as shown in Table 2.

TABLE 2

| Positions | Reflective |
|---|---|
| (0, 0) to (19, 10) | Reflective 50 |
| (0, 11) to (19, 19) | Reflective 20 |

When traveling in a first region defined by (0, 0) to (19, 10) in Table 2, the robot or depth sensing module may consider the information that a reflectance is 50 and thus may filter the depth information in a space having a category in which a reflectance of the floor is 50. Further, when traveling in a second region defined by (0, 11) to (19, 19), the robot or depth sensing module may consider the information that a reflectance is 20 and thus may filter the depth information in a space having a category in which a reflectance of the floor is 20. FIG. 7 illustrates a configuration of each of the light-source period storage and context storage according to an embodiment of the present disclosure. The light-source period storage 145a indicates a period at which the sun-light as external light categorized in FIG. 6 shines or a lighting device as an external light source categorized in FIG. 6 is turned on. The external light (sun-light or lighting device) L1 has a period so that the sun light shines or the device turns on for 06:00 to 22:00 (Time field) from Monday to Friday (Day field) regardless of positions (POS field is "ALL"). In another example, the external light (sun-light or lighting device) L3 has a period so that the sun light shines or the device turns on for 10:00 to 17:00 (Time field) from Saturday and Sunday.

The lighting device may be turned on or off on a specific day or date. Sunset/sunrise times may be applied to sunlight. In addition to the light-source period, the context storage 147a presents a condition, i.e., context information, under which the sun-light shines or the lighting device turns on or off. The context information may be mainly applied to the lighting device. However, the context information may be configured to have a combination of weather information such as sun-light and the condition under which the lighting device turns on or off.

A lighting device placed at a position (7, 17) (indicated in FIG. 6 by 15) among light-sources having the category L1 may be controlled to turn on or off depending on external weather. This is because a stationary object 211a made of a transparent material that transmits external light is disposed at a position corresponding to a L1 light source indicated by 15 in FIG. 6. Therefore, as indicated by 147a, the context information for turning off (OFF) the lighting device at "Sunny_Weather" and for turning on (ON) the lighting device in a "Night/Rainy_weather" may be configured. All of L3 light-sources may be configured to turn on (ON) when a corresponding space is crowded. Further, all of L3 light-sources may be configured to turn off on Saturday and Sunday.

While the robot equipped with the depth sensing module 100 or the depth sensing module 100 travels, the robot or depth sensing module 100 may pass through an external light region. In this case, the robot or depth sensing module 100 may register the robot's current position and a current time in the map storage 141. Then, the robot or depth sensing module 100 accumulates and learns travel sections affected by the sun-light or lighting device based on the information in FIG. 6 and FIG. 7. Thus, when traveling in the learned section and at the learned time, the robot or depth sensing module 100 may activate a filter to remove the influence of the sun-light or lighting device, thereby eliminating the influence of the external light and producing accurate depth information.

The activation of the filter may allow the sensed-data filter 120 in FIG. 1 to filter the garbage value from the depth information. In an embodiment, the filter 120 may compare depth values of the depth cells in the accumulated depth information with each other and then determine whether an obstacle is present or an error of a depth value occurs due to external light. Increasing the accumulated depth information in this process may improve the accuracy of determining whether the depth value is a garbage value. This may cause a delay in identifying the depth information.

However, the depth sensing module 100 may be configured to filter the garbage value in the depth information within a delay time that does not cause a problem in determining the obstacle based on the travel velocity of the depth sensing module 100 or the robot and a capability at which the robot copes with the obstacle. In this process, the information included in the above-described light information provider 140 may be updated for a fast filtering via learning to improve the filtering accuracy.

Figure 8:
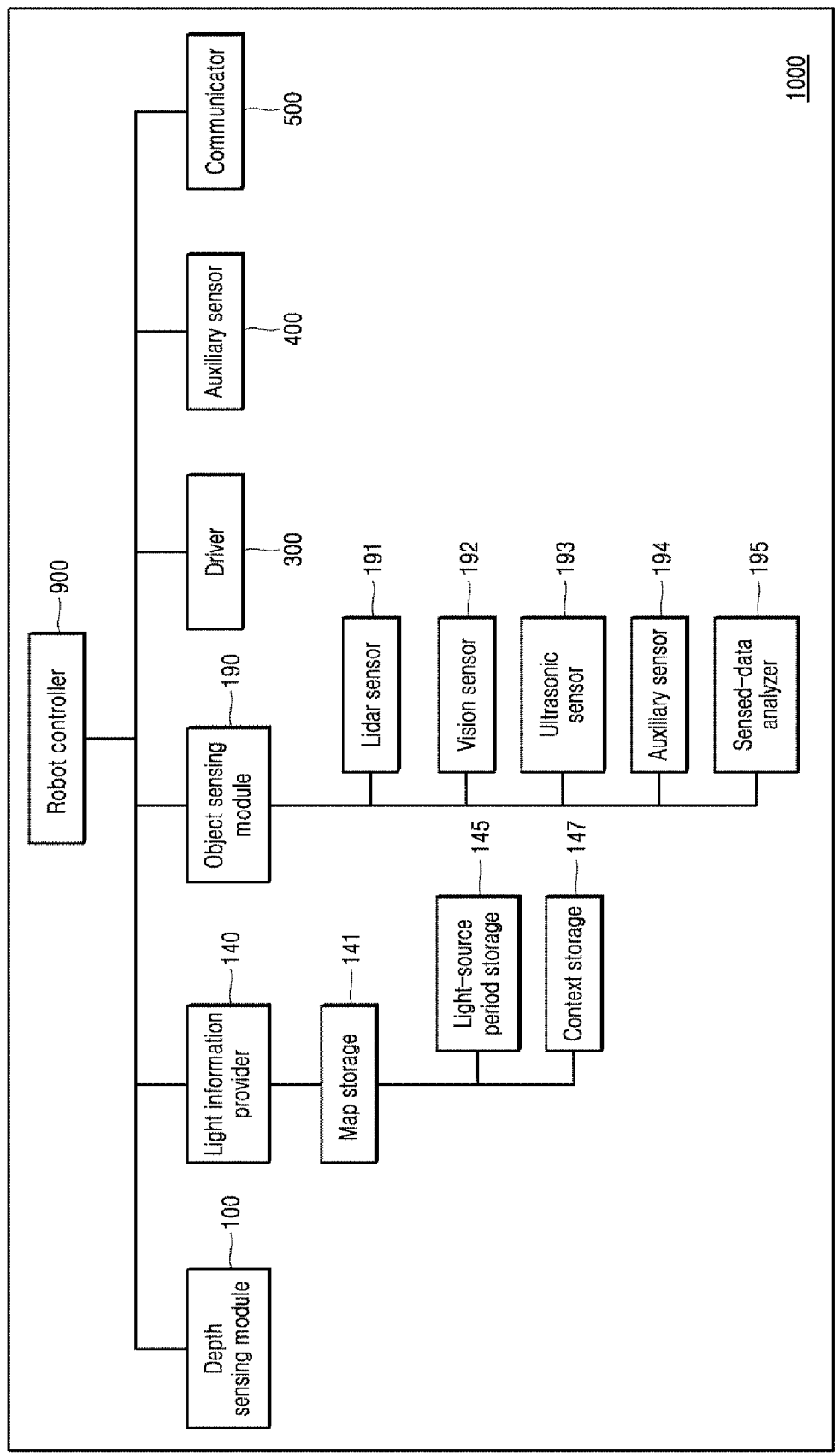
FIG. 8 illustrates a configuration of a robot according to an embodiment of the present disclosure.

FIG. 8 illustrates a configuration of a robot according to an embodiment of the present disclosure. A robot 1000 includes the depth sensing module 100 as described above. Further, the light information provider 140 may constitute the robot 1000 and may be a component of the robot 1000 independently from the depth sensing module 100. In one example, the robot 1000 may include an object sensing module 190 for sensing external objects, a driver 300 for moving the robot 1000, a service-providing device 400 for providing a specific service, and a communicator 500.

FIG. 8 shows a hierarchical configuration of the robot. However, this is intended for logical representation of the components of the robot. Thus, a physical configuration of the robot may be different from the logical representation of the components. A plurality of logical components may be included in one physical component. Alternatively, a plurality of physical components may implement one logical component. Further, the hierarchy in FIG. 8 does not necessarily have to be maintained.

The object sensing module 190 senses external objects and provides the sensed information to the robot controller 900. In an embodiment, the object sensing module 190 may include a lidar sensor 191 that calculates a material and distance of an external object such as a wall, glass, and metal door at a current position of the robot based on a signal intensity and a reflection time (velocity). Further, the object sensing module 190 may further include a vision sensor 192 for acquiring an image of an external object to the robot.

The vision sensor 192 may include a camera. The vision sensor 192 may capture images of objects around the robot. In particular, the robot may distinguish an image having a moving object from an image having a stationary object to distinguish whether an external object is a moving object.

Further, additionally, the object sensing module 190 may include an ultrasonic sensor 193 for sensing presence or absence of an object disposed within a predefined distance from the robot 1000. The ultrasonic sensor 193 provides determination information about whether an object exists within a predefined distance from the robot 1000.

In addition, the object sensing module 190 may include a plurality of auxiliary sensors 194 including a heat sensor, an ultrasonic sensor, and the like. The auxiliary sensors provide auxiliary sensed information needed to create a map or sense an external object. Further, each of the auxiliary sensors may sense an object placed externally while the robot is traveling and provide a sensing result.

The sensed-data analyzer 195 analyzes the information sensed by the multiple sensors and delivers the analyzing result to the robot controller 900. For example, when an object placed around the robot is detected by the multiple sensors, each sensor may provide information on characteristics and distance of the corresponding object. The sensed-data analyzer 195 may combine the characteristics and distances to produce a resulting value and pass the resulting value to the robot controller 900.

The robot controller 900 provides the sensed distance information to the depth sensing module 100 so that the information may be referred to in a process of filtering the depth information. For example, the sensed-data analyzer 195 provides information indicating that an object does not exist within 5 meters from the robot to the robot controller 900. The robot controller 900 provided this information to the depth sensing module 100. However, when a depth value smaller than 5 meters is detected in depth information generated by the depth sensing module 100, the depth sensing module 100 may identify whether the depth value of a corresponding depth cell is distorted by external light and, if so, may filter the depth value.

The driver 300 may be configured to move the robot 1000 and may include a wheel. The driver 300 moves the robot 1000 under control of the robot controller 900. In this connection, the robot controller 900 may identify a current position of the robot 1000 in a region stored in the map storage 141 and may provide a travel signal based on the current position to the driver 300. The robot controller 900 may generate a route in real time or may generate a route during travelling using various information stored in the map storage 141.

The service-providing device 400 may be configured to provide a specialized service of the robot. For example, when the robot acts as a cleaning robot, the service-providing device 400 includes components necessary for cleaning. When the robot acts as a guide robot, the service-providing device 400 includes components necessary for guidance. When the robot acts as a security robot, the service-providing device 400 includes components necessary for security.

The service-providing device 400 may include various components according to the service provided by the robot. The present disclosure is not limited thereto. The communicator 500 may be configured for transmitting information obtained by the robot to an external server or other robots, or receiving information from the aforementioned server or other robots.

In particular, the communicator 500 may receive information about a current weather from external devices and identify, based on the information, whether in a current condition, strong external light such as a sun-light occurs. The communicator 500 may provide the identification result to the robot controller 900. Then, the robot controller 900 may provide the condition at which the external light occurs to the depth sensing module 100 so that the condition may be applied to filter the depth information.

The robot controller 900 of the robot 1000 may create or update a map in the map storage 200. Further, the robot controller 900 may combine sensed information provided by the depth sensing module 100 and sensed information provided by the object sensing module 190 during the travelling thereof, and may control the travel route of the robot based on the combination result. That is, the robot controller 900 may identify an object around the robot based on the sensing results from the depth sensing module 100 and the object sensing module 190 and control the travel path of the robot 1000 based on the identification result.

Further, the light information provider 140 may be disposed independently of the depth sensing module 100. In this process, the robot controller 900 may store position information of the external light acquired during the travelling thereof into the light information provider 140. Further, when in the process of creating the map about the travel space of the robot, a change in the reflection or transmission characteristic of the wall or floor in the travel space of the robot in the map storage 141 is identified, an attribute of the stationary object of the map storage 141 may be changed.

In one example, the robot controller 900 may provide the depth sensing module 100 with distance information of an object sensed by the object sensing module 190 in a region corresponding to the depth information generated by the depth sensing module 100. The controller 150 of the depth sensing module 100 may determine whether the distance information of the object provided from the robot controller 900 is at least partially inconsistent with the depth information. If so, the controller 150 of the depth sensing module 100 may provide information about a region corresponding to the inconsistent depth information to the sensed-data filter 120 so that the sensed-data filter 120 may more accurately identify the filtering target region.

Figure 9:
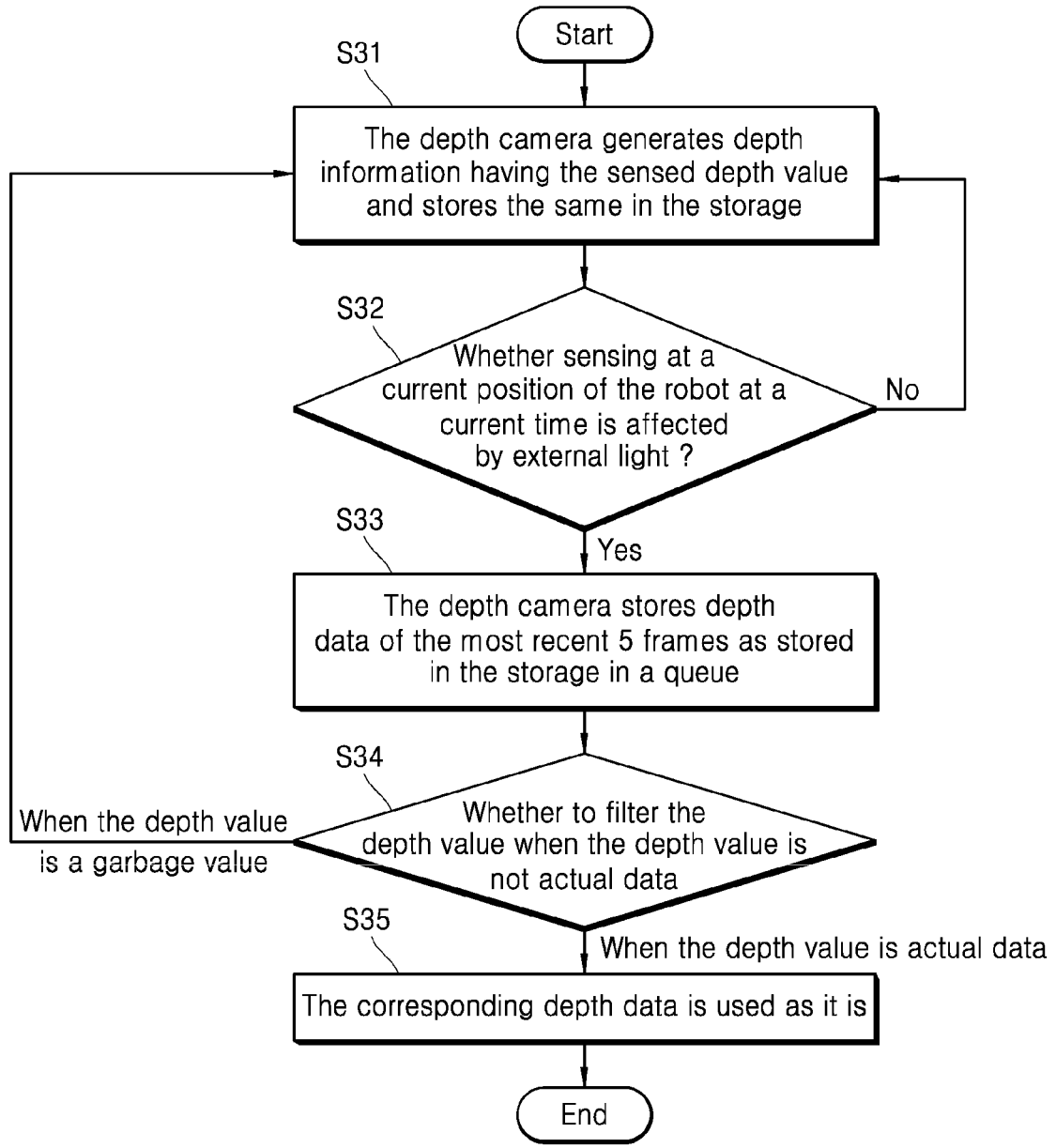
FIG. 9 illustrates a depth sensing process according to one embodiment of the present disclosure.

FIG. 9 illustrates a depth sensing process according to one embodiment of the present disclosure. FIG. 9 is directed to a process of determining whether a sensing at a current position of the robot or depth sensing module is affected by the sun-light, based on the information stored in the map storage of the light information provider as described above, and, if so, analyzing and filtering a depth value (input data) of each depth cell from the depth information captured by the depth camera of the depth sensing module.

The depth camera 110 generates depth information having the sensed depth value and stores the same in the storage 130 S31. Further, the depth camera identifies whether sensing at a current position of the robot at a current time is affected by external light, especially sun-light or strong light of the lighting device S32. This may be carried out based on the information stored in the light information provider 140 constituting the depth sensing module 100 or the robot 1000. When the sensing at a current position of the robot at a current time is affected by external light, the depth camera stores depth data, i.e., depth information having with a depth value, of the most recent 5 frames as stored in the storage 130 in a queue S33.

The aforementioned depth data of the five frames mean depth information captured at previous five time-points to the current time-point. Further, the depth camera may compare a depth value of each depth cell at each of the previous frames and a depth value of each depth cell at a current frame, and identify, based on the comparison result, whether each depth value is actual data or a garbage value and determine whether to filter the value based on the identification result. When the depth value is the garbage value, a step 31 is executed in which the corresponding depth value is excluded and new depth information is sensed and stored. To the contrary, when the depth value is not the garbage value, the corresponding depth data may be used S35. When the depth value is the garbage value, this means that the external light yields inaccurate depth information.

When it is determined that the depth value is the garbage value in the S34 process of FIG. 9, a depth value of the depth cell corresponding to the garbage value may be newly calculated. For example, when a depth value of a depth cell as a specific position constantly decreases by 1 and then greatly and suddenly decreases 1000 in five depth information corresponding to the previous five frames, the greatly and suddenly decreased value may be determined as a garbage value. However, the step S31 may be performed to discard the garbage value and calculate new depth information. Alternatively, correct depth information may be calculated by correcting the garbage value. For example, when a depth value 15c of FIG. 3 is identified as a garbage value, a depth value 795 of the corresponding cell thereto may be converted to 559 based on the depth information 11 and 12 of the previous frames.

Figure 10:
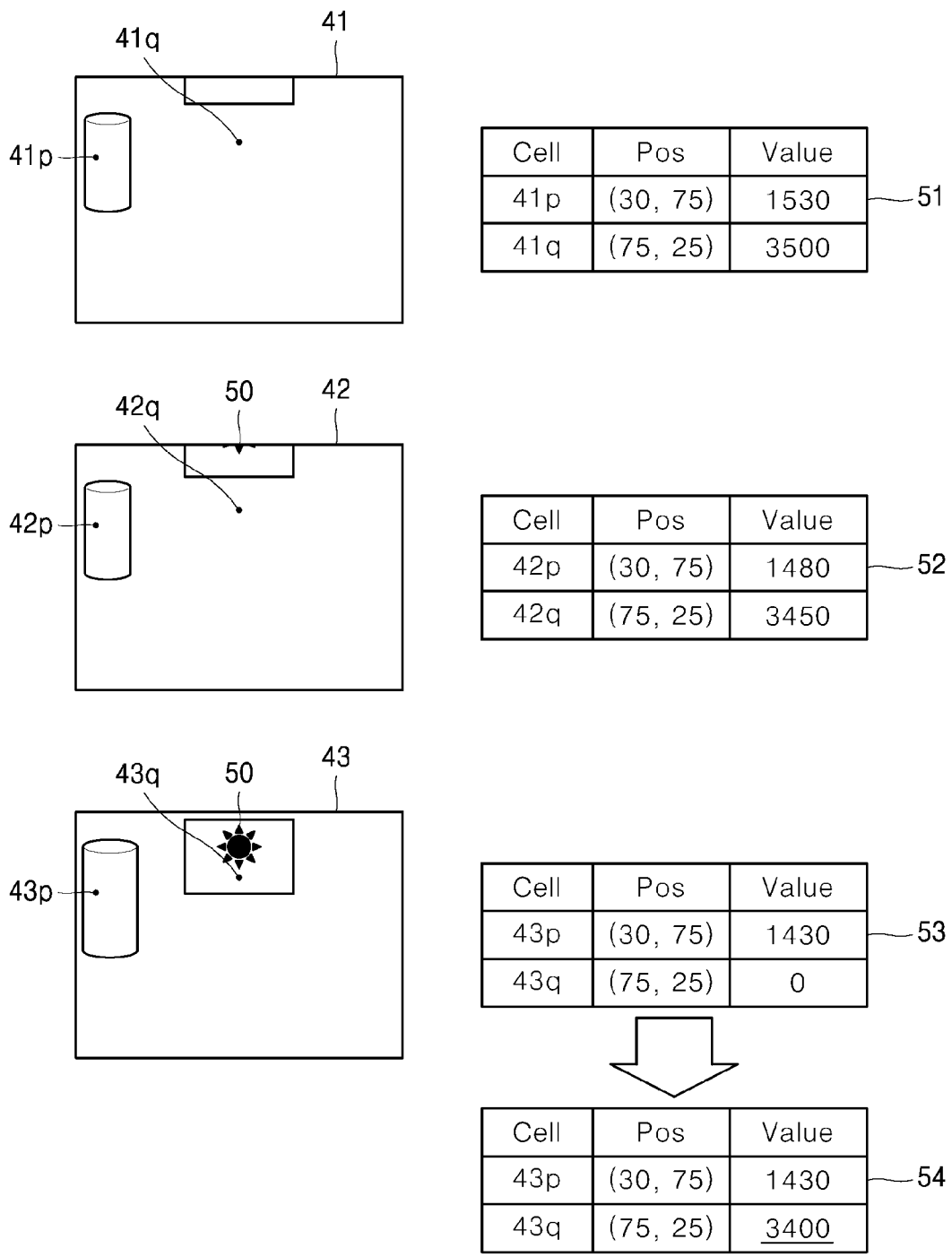
FIG. 10 is a diagram illustrating a process in which a depth camera generates depth information and filters the depth information according to an embodiment of the present disclosure.

FIG. 10 is a diagram illustrating a process in which a depth camera generates depth information and filters the depth information according to an embodiment of the present disclosure. 41 to 43 indicate shapes of objects disposed in front of the depth sensing module 100 or robot 1000 while travelling. The shape of the object is obtained on a frame basis. 51 to 53 indicate generated depth information corresponding to 41 to 43.

Each shape 41 to 43 may be divided into depth cells. The depth information includes a depth value in each depth cell. 51 to 53 indicate depth values of specific depth cells 41p, 41q, 42p, 42q, 43p, and 43q. A space having the depth information is divided into depth cells having a total number of 150×100. Each of 41p, 42p and 43p has a coordinate (30, 75) at each of 41, 42 and 43. Each of 41q, 42q, and 43q has a coordinate (75, 25) at each of 41, 42, and 43.

In a configuration of the entire depth information, a depth value may be stored for each depth cell as shown in FIG. 2 and FIG. 3. For simplicity, FIG. 10 shows only depth values of specific depth cells.

Depth values of 41*p* and 41*q* are sensed as 1530 and 3500 respectively in 51. Depth values of 42*p* and 42*q* are sensed as 1480 and 3450, respectively in 52. A portion of the sun-light 50 is introduced into 42, but does not affect the depth sensing.

However, full sun-light 50 is introduced into 43, 43*p* in 53 is 1430 which constantly decreases by 50 compared to 1480 as a depth value of a cell with the same depth cell (position (30, 75)) in 52. A depth value in 43*q* as a depth cell (position (75 and 25)) in 53 is identified to be zero irregularly when compared to a depth value 3450 in the same depth cell (position (75 and 25)) in 52. This means that a depth value sensed by the depth sensing module is a garbage value due to the sun-light 50.

Therefore, the sensed-data filter 120 filters a value having a large change from a specific value, such as zero in 43*q* in 53, among the depth values. The controller 150 may remove the filtered depth information 53 or generate and store the depth information 54 having a new depth value 3400 based on the previous depth information 51 and 52.

Further, in this process, the controller 150 may determine whether the depth value of the large change as the garbage value is filtered or a new object is sensed, based on a value sensed by the object sensing module 190 of the robot 1000. For example, an object may suddenly approach the robot. In this case, when the object sensing module 190 senses that an object is near a front face of the robot, the sensed-data filter 120 may not filter the corresponding depth value but may use the corresponding depth value as it is. Alternatively, the depth camera 110 may again generate depth information for sensing accuracy.

A process in which the depth sensing module 100 analyzes the depth information as shown in FIG. 10 may be summarized as follows.

Even when no obstacles exist in front of the depth camera 110, a depth value of an object within a specific range in the depth information changes excessively between frames due to the influence of the sun-light. Thus, a specific object is suddenly detected or identified as disappearing. In this case, this depth information may be filtered.

For example, a situation in which a depth value of a specific depth cell in a range between 400 and 1000 mm in front of the robot is continuously detected in the depth information between 2 to 3 frames and then suddenly becomes 0 may be repeated. In particular, the same value is not detected in the depth information between 2 to 3 frames in succession. That is, a depth value increases or decreases significantly in a non-linear manner, such as 200, 700, 400, 0, 1000, etc. In this case, the depth sensing module 100 may identify the depth value change due to the influence of the external light rather than the depth value change due to sudden appearance of an object, and thus may filter the corresponding depth value.

In this process, the depth sensing module 100 may refer to the sensing result of external objects sensed by the object sensing module 190 to identify whether the object is actually placed in front of the robot. Further, a position of the external light relative to the current position of the robot, or the light intensity thereof, context information, etc. may be extracted from the light information provider 140. Thus, the depth value may be filtered based on a possibility that the external light may exist as determined based on the extracted information. Further, when the optical sensor 111 senses the intensity of external light. When the sensed intensity of the light affects the depth sensing, the depth value may be adjusted.

The robot may use the information in the map storage 141 in FIG. 10. Further, the robot may identify whether the external light is sensed at a current position of the robot or whether the reflected external light exists, based on the combination of the information in the map storage 141 in FIG. 10 and the reflectance of the material of the wall of the specific space or the transmittance of the external light due to an arrangement of the window as shown in FIG. 6. Further, the reflectance of the floor as shown in Table 1 above, and the position of the lighting device in the map storage 141*a* may be identified. Thus, the effect of the light may be removed from the depth information based on the identified information, thereby to accurately calculate the depth value.

In one example, the robot may refer to a specific position (x, y) of the depth information to identify the change in the depth value of the specific depth cell in 41 to 43 in FIG. 10. According to another embodiment of the present disclosure, when there is a reference point in 41 to 43, a relative coordinate to the reference point may be obtained. For example, when the vision sensor 192 identifies that a cylinder column in 41 gradually approach the robot in 42 and 43, the robot may identify a position of the depth cell in proportion to a distance between a region having a rapidly changing value and the cylinder column.

In one embodiment, a position of 42*p* is (30, 75) but may be (28, 73) in 42. In order to analyze the more accurate trend of the change of the depth value of the depth cell, the information of the object sensed by the vision sensor 192 may be used.

Figure 11:
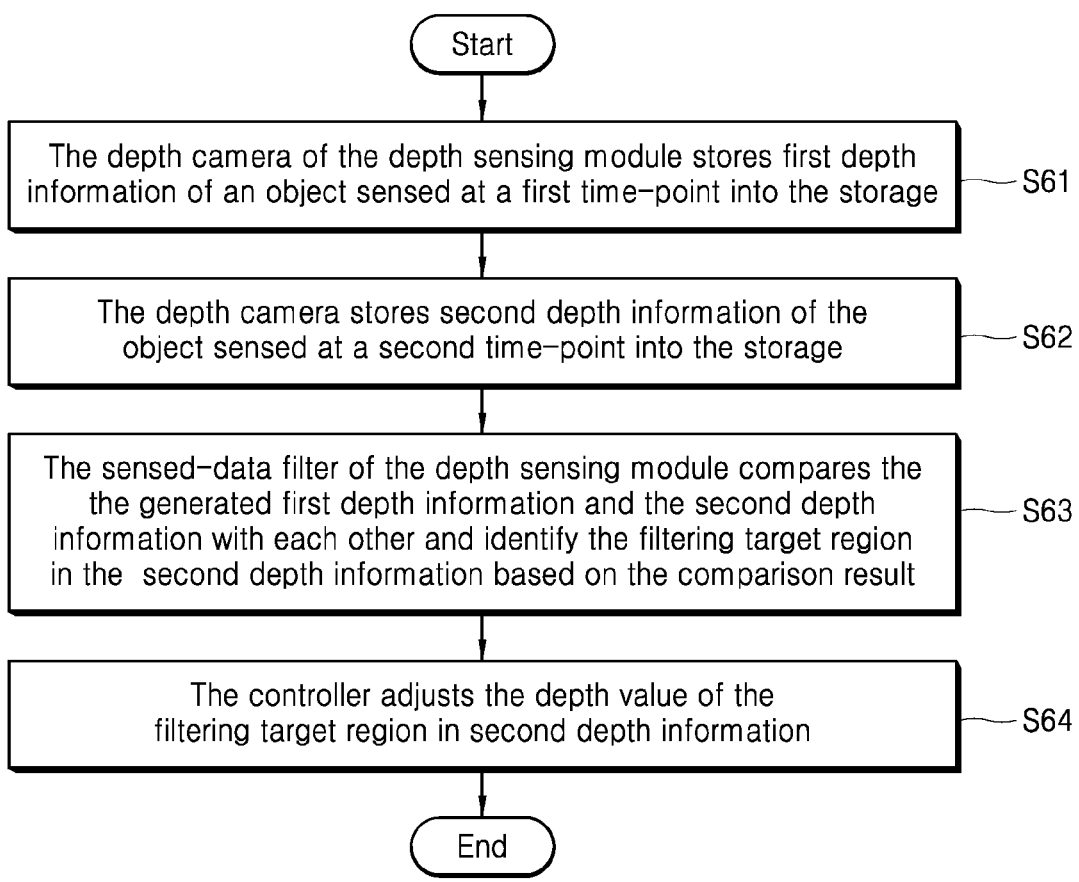

FIG. 11 and FIG. 12 illustrate a process in which a depth sensing module senses an object's depth value based on influence of external light according to an embodiment of the present disclosure. Both the depth sensing module 100 that operates independently or the robot 1000 equipped with the depth sensing module 100 may implement this process.

In FIG. 11, the depth camera 110 of the depth sensing module 100 stores first depth information of an object sensed at a first time-point into the storage 130 S61. Further, the depth camera 110 stores second depth information of the object sensed at a second time-point into the storage 130 S62. Multiple depth information may be stored before the first time-point.

Referring to FIG. 12, n depth information generated at each time-point, that is, at each frame may be stored in the storage 130. Depth values of depth cells at the same position in the depth information stored in the storage 130 are sensed by the depth camera 110 while the depth sensing module 100 has traveled for a short time. Thus, the depth value of each depth cell does not change significantly between the fames.

The change in the value may vary depending on the travel velocity of the depth sensing module 100 or the robot 1000, the travel velocity of the external object, and, a sensing rate (a number of frames sensed per second) at which the depth camera 110 senses a depth value. Therefore, the controller 150 or the sensed-data filter 120 of the depth sensing module 100 may set a maximum variation reference value of the depth value based on the travel velocity and the sensing rate. In one embodiment, when the travel velocity of the depth sensing module 100 is 500 mm/s and when a maximum velocity of the external object is 1000 mm/s, a distance of about 1500 mm therebetween may occur in one second.

In one example, when assuming that the sensing rate at which the depth camera 110 senses a depth value is 30 frames per second, the depth information generated at the frames may have a depth value difference of up to 50 mm (1500 mm/30 seconds) therebetween. Therefore, after setting the maximum variation reference value for the depth value to 50 mm or a slightly larger value than 50 mm (e.g., 100 mm), a depth value of a specific depth cell in a current frame in the depth information as accumulated in FIG. 12 may be compared to that in a previous frame. When a variation therebetween is larger than the maximum variation reference value for the depth value, the sensed-data filter 120 may identify whether the depth value having the variation is a garbage value.

Returning to FIG. 11, the sensed-data filter 120 of the depth sensing module 100 compares the generated first depth information and the second depth information with each other and identify the filtering target region in the second depth information S63. In the identification process, when a variation of a specific depth value is greater than the predefined reference value (maximum variation reference value), the sensed-data filter 120 identifies a depth cell corresponding to the specific depth value as a filtering target region.

Alternatively, when a depth value of a corresponding depth cell is determined as a garbage value based on the characteristics of the external light as identified using the light information provider 140, or the intensity of the external light as sensed by the optical sensor 111, or alternatively, based on information such as the presence or absence or distance of an external object sensed by the object sensing module 190 of the robot 1000, the sensed-data filter 120 identifies a filtering target region having one or more depth cells.

The filtering target region may have one or more depth cells in the second depth information. The controller 150 adjusts the depth value of the filtering target region in second depth information S64.

In one embodiment, adjusting the depth value may include removing the second depth information from the storage 130 and generating depth information at a new time-point.

In another embodiment, adjusting the depth value may include changing the depth value of the filtering target region in the second depth information. This may change depth values of depth cells constituting the corresponding filtering target region in the second depth information, based on the first depth information or based on other depth information adjacent in time thereto. In one embodiment, as shown in FIG. 10, the depth information in 53 is changed to the depth information in 54.

Figure 13:
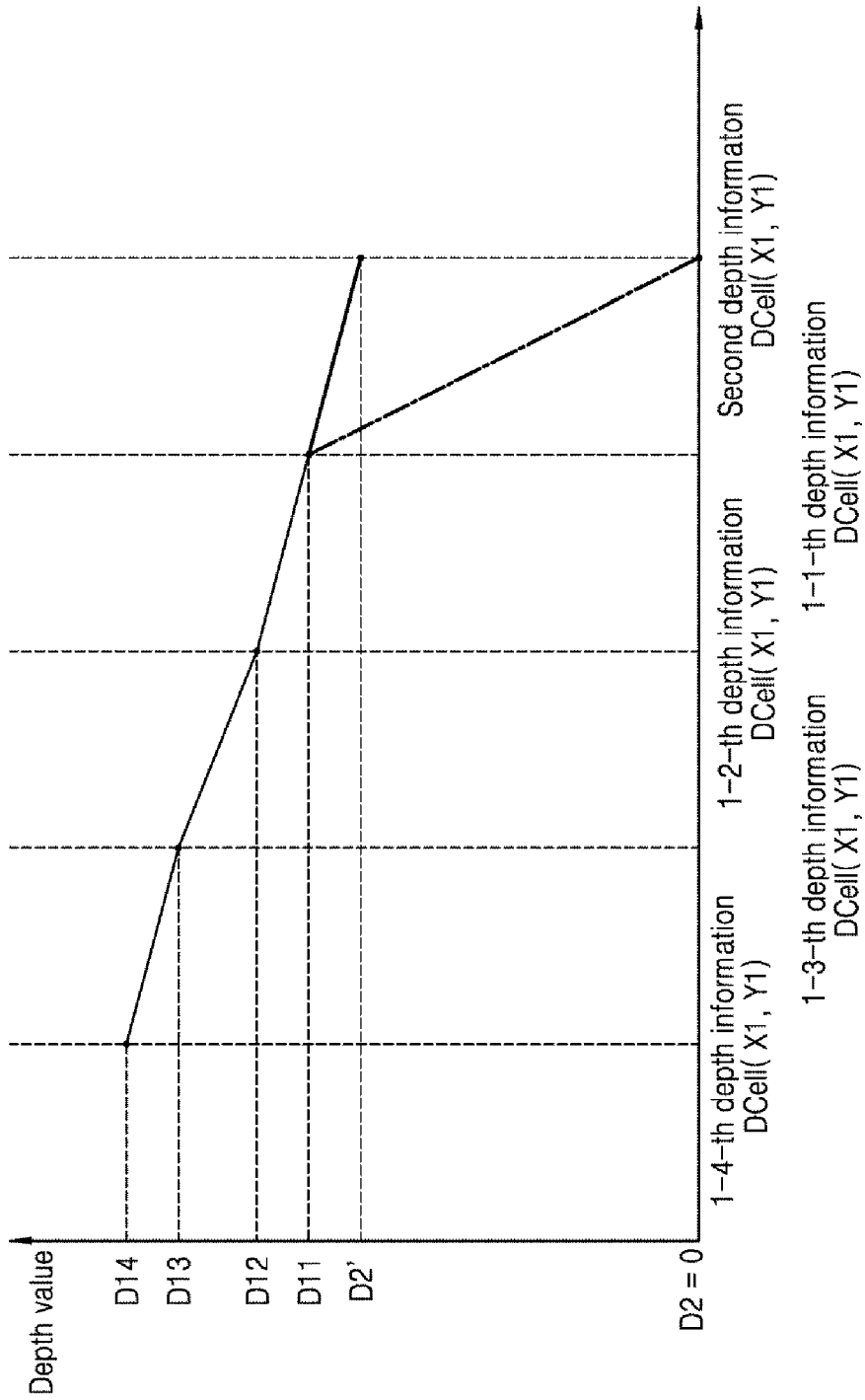
FIG. 13 illustrates a process of changing a depth value according to an embodiment of the present disclosure.

FIG. 13 illustrates a process of changing a depth value according to an embodiment of the present disclosure.

As shown in FIG. 13, depth cells of the same position (X1 and Y1) in 1-1-th depth information to 1-4-th depth information have values of D11 to D14, respectively. Change between D11 to D4 has a decreasing trend. Each of differences between D11 and D12, D12 and D13, and D13 and D14 is within a predefined error range.

However, when the depth value D2 in the second depth information is set to a value that is close to zero or that is out of the change trend between the previous D11 to D14, the sensed-data filter 120 determines the D2 as the garbage value. Further, depth values of depth cells at the same position (X1 and Y1) in the second depth information may be set to D2' based on previously sensed depth information or subsequently sensed depth information.

To calculate D2, the controller may calculate D2 using the previous depth information as it is. Alternatively, the controller may calculate D2' by applying a weight to previous depth information, and set the D2' value to a depth value of DCell (X1 and Y1) as a depth cell of the second depth information. That is, a depth value of each of the depth cells in the filtering target region is calculated by the controller 150 via a new calculation to generate new depth information, which is stored in the storage.

Briefly, the controller 150 may apply the first depth information (or 1-1-th to 1-4-th depth information) to the filtering target region of the second depth information to generate new depth information.

Alternatively, the controller 150 may apply depth information generated by applying a weight to the first depth information (or 1-1-th to 1-4-th depth information) to the filtering target region of the second depth information at the second time-point, thereby to generate new depth information. Further, the controller 150 may store the newly created depth information as the depth information at the second time-point in the storage 130. The above-described weighting process may reflect the travel velocity of the robot.

FIG. 14 illustrates an example of newly generating and storing depth information according to an embodiment of the present disclosure. The depth sensing module 100 generates depth information such as 10p, 10q, and 10s in a chronological order. In this process, regions (DCell1 and DCell2 regions in 10s) whose depth values have significant changes relative to corresponding values of the previous depth information among the most recent depth information of 10s are identified as filtering target regions. In one embodiment, the sensed-data filter 120 identifies that a first depth value of a first depth cell Dcell1 or DCell2 is decreased by 10 or 9 between first depth information 10p and 10q.

Further, a second depth value of a second depth cell Dcell1 or DCell2 of second depth information 10s corresponding to the first depth cell Dcell1 or DCell2 of 10p and 10q has 0. The sensed-data filter 120 may identify a significant change from a previous value.

More specifically, the sensed-data filter 120 may identify that the depth value of DCell1 changes from 90 to 80 to 0, and thus determine the last depth value "0" as the garbage value. Similarly, the sensed-data filter 120 may identify that the depth value of DCell2 changes from 80 to 71 to 0, and thus determine the last depth value "0" as the garbage value. As a result, the sensed-data filter 120 may generate new depth information 10s'. The filter may identify that values of depth cells constituting the filtering target region have been changed to 70 and 62, respectively. This change in the depth values reflects the change trend between 10p and 10q.

In another example, the sensed-data filter 120 may only use previous depth information. For example, when the filter refers to 10q and when there is no influence of external light, and when a maximum difference that may occur between depth values of 10q and 10s is 20, the filter may identify a depth value having a difference larger than 20 between frames as garbage value and calculate new depth value.

FIG. 13 and FIG. 14 are based on the change in the depth value of the depth cell at the same X/Y point in the depth information between frames. The present disclosure is not limited thereto. For example, when an object as captured by the vision sensor 192 of the object sensing module 190 is identified to travel in a right direction, the depth values of the associated depth cell before and after the movement may be compared with each other.

In one embodiment, a cell of a position (1, 1) is a first depth cell in the first depth information. However, when the same object travels to a position (1, 2), a second depth cell may have a position (1, 2) in the second depth information. For this purpose, the robot may track the travel of the object sensed by the vision sensor 192 and may analyze the related depth cells.

In summary, a position of the first depth cell of the first depth information and a position of the second depth cell of the second depth information may be the same or different as or from each other. When they are different from each other, the robot may track the travel of the object and identify the travelling same object and distinguish different positions from each other based on the travelling same object.

Figure 15:
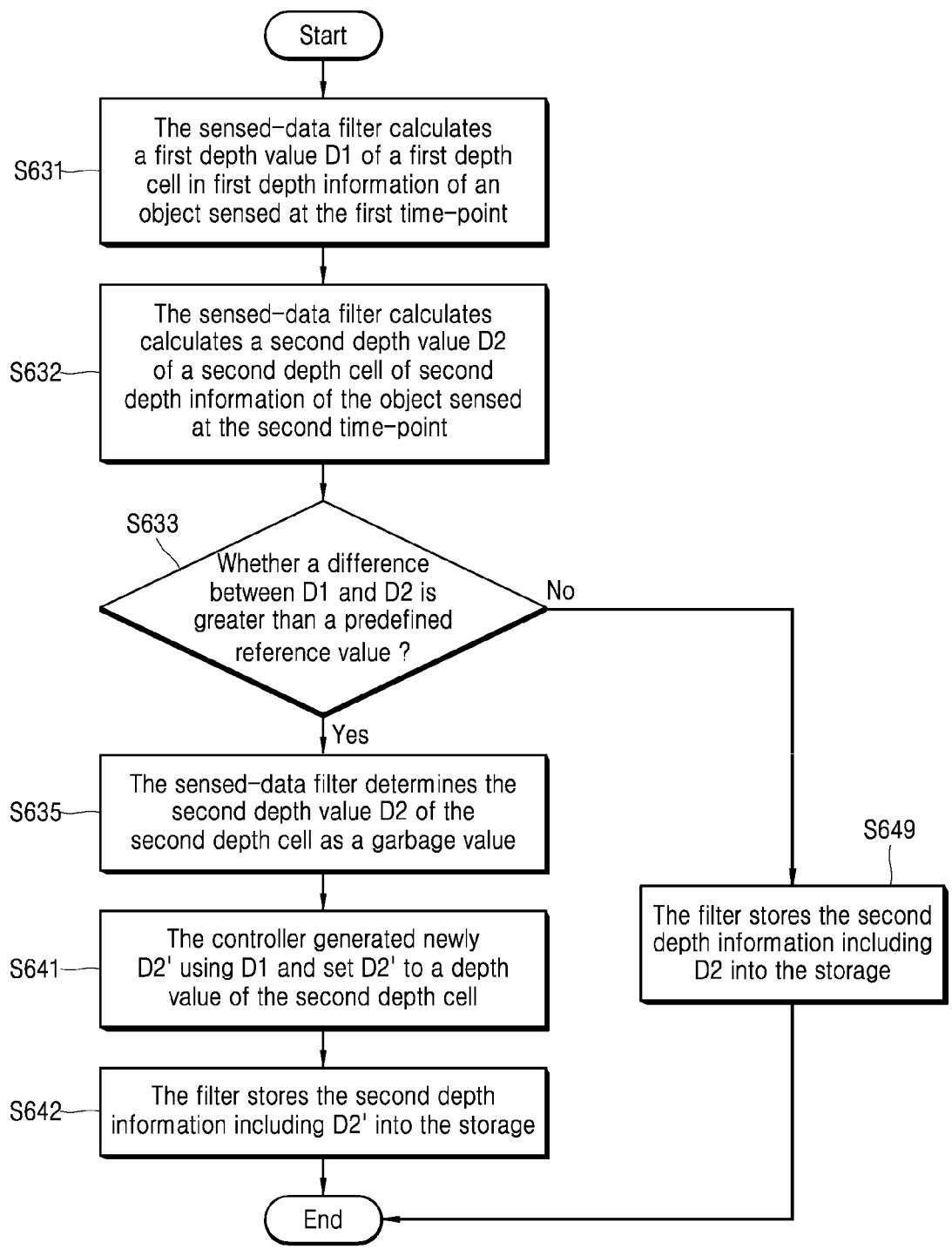
FIG. 15 illustrates in detail an adjustment process of a depth value according to one embodiment of the present disclosure.

FIG. 15 illustrates in detail an adjustment process of a depth value according to one embodiment of the present disclosure. FIG. 15 describes the S63 and S64 processes of FIG. 11 in a detailed manner and refers to the embodiment of FIG. 14.

The sensed-data filter 120 calculates a first depth value D1 (e.g., D11 to D14 in FIG. 14) of a first depth cell in first depth information of an object sensed at the first time-point S631. Further, the sensed-data filter 120 calculates a second depth value D2 of a second depth cell of second depth information of the object sensed at the second time-point S632. The sensed-data filter 120 performs filtering as in S635 when a difference between D1 and D2 is greater than a predefined reference value. When the difference is smaller than or equal to the predefined reference value, the filter 120 stores the second depth information including D2 into the storage S649.

An embodiment of determining whether the difference between D1 and D2 is greater than the predefined reference value in S633 may be configured as follows: When the difference between D1 and D2 is greater than a difference between the position of the depth sensing module 100 at the first time-point and the position of the depth sensing module at the second time-point, or alternatively, when the difference between D1 and D2 is larger than a predetermined reference value such as a maximum change reference value, together with considering the travel velocity of the object, D2 may be likely to be considered as a garbage value S635.

In one example, in one embodiment of S641, the controller 150 uses D1 for generating D2' (new depth value) based on the difference between the positions of the depth sensing module at the first time-point and the second time-point, prior to calculating a new D2'. Reflecting the position difference means applying a change trend between previously accumulated depth values or reflecting distance information along which the depth sensing module had moved between two time-points. Further, the controller 150 sets the newly generated D2' to a depth value of the second depth cell S642.

Figure 16:
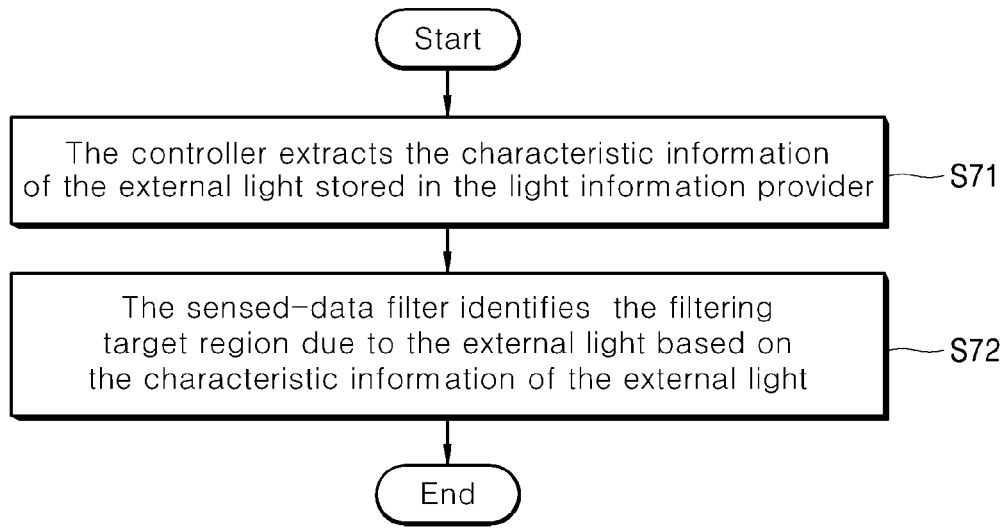
FIG. 16 illustrates a process in which a sensed-data filter identifies a filtering target region according to an embodiment of the present disclosure.

FIG. 16 illustrates a process in which a sensed-data filter uses characteristic information of external light in a process of identifying a filtering target region according to an embodiment of the present disclosure. As described above, the light information provider 140 includes the map storage 141, the light-source period storage 145, and the context storage 147. The sensed-data filter 120 may identify the filtering target region based on a result of analyzing the effect of light at a current position of the robot.

The controller 150 extracts the characteristic information of the external light stored in the light information provider 140 S71. In one embodiment, the controller identifies whether a lighting device is present in the current position of the depth sensing module 100 or the robot 1000 based on the map storage 141. Further, the controller may identify whether a stationary object made of a material that transmits external light, such as a window is present in front of the depth sensing module 100, based on the map storage 141.

Further, more precisely, the controller 150 may identify whether the external light such as a lighting device or sun-light is present based on the light-source period storage 145 and context storage 147. In addition, the controller 150 may use the optical sensor 111 to identify the presence or absence of strong external light in the vicinity thereto. From a result of the identification, the controller 150 may calculate information on whether the external light exists or information on the intensity of the external light. The intensity of the external light may be calculated by the controller 150 based on the reflectance of the floor or wall material.

That is, even when a high illuminance lighting device is placed on the ceiling, when a light reflectance of the floor is very low, the depth information may be less influenced by external light toward the floor. The controller 150 may reduce the likelihood of occurrence of external light and then provide the reduced likelihood to the sensed-data filter 120.

On the contrary, when the light reflectance of the floor is very high even when a low illuminance lighting device is placed on the ceiling, the depth information may be highly influenced by external light toward the floor. The controller 150 may increase the likelihood of occurrence of external light and then provide the increased likelihood to the sensed-data filter 120. Therefore, in the process shown in FIG. 16, the sensed-data filter 120 may identify the filtering target region due to the external light based on the characteristic information of the external light S72.

Figure 17:
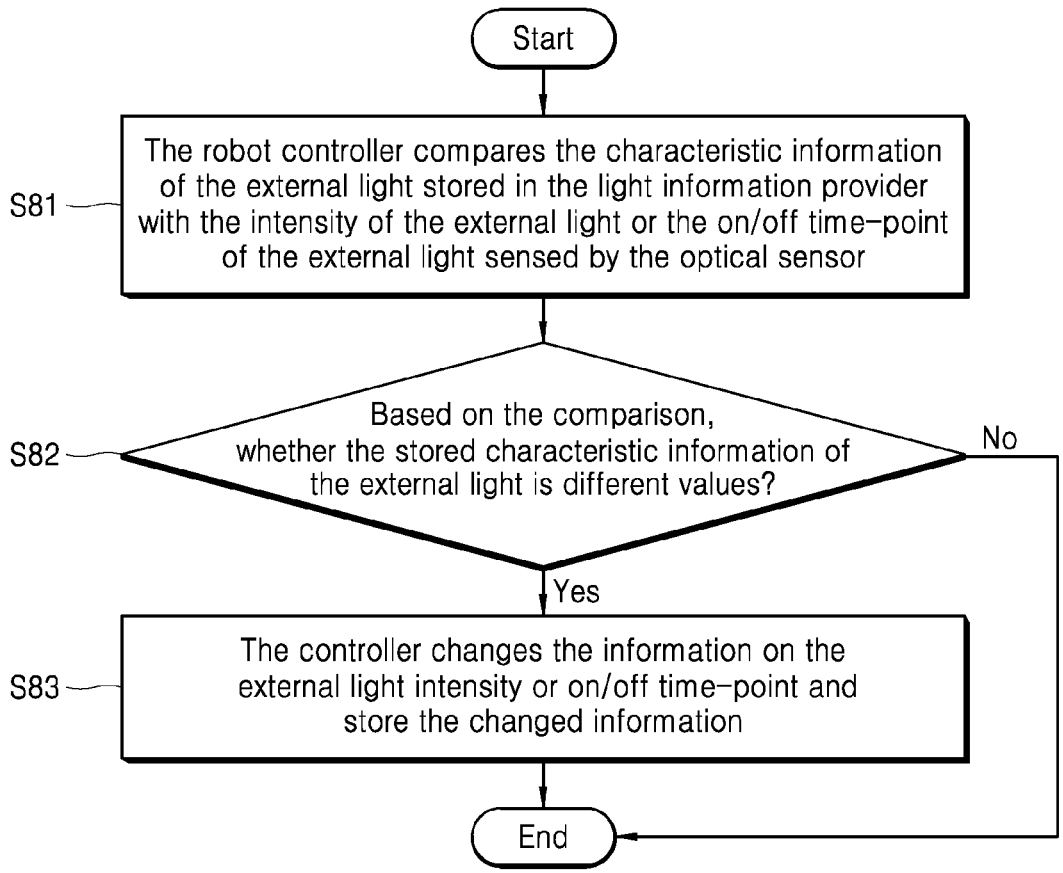
FIG. 17 illustrates a process of updating external light information sensed during a robot travels according to an embodiment of the present disclosure.

FIG. 17 illustrates a process of updating external light information sensed during travelling of a robot, according to an embodiment of the present disclosure. The updating may include changing existing characteristic information of the external light, adding new external light characteristic information, or deleting previously stored external light characteristic information.

The depth sensing module 100 or robot 1000 includes the optical sensor 111. The optical sensor 111 may be a component of the robot 1000 independently of the depth sensing module 100.

The robot controller 900 compares the characteristic information of the external light stored in the light information provider 140 with the intensity of the external light or the on/off time-point of the external light sensed by the optical sensor 111 during the travelling of the robot 1000 S81. When, from a result of the comparison, the characteristic information is different from the intensity of the external light or the on/off time-point of the external light sensed by the optical sensor 111 S82, the controller 900 may change the information on the external light intensity or on/off time-point and store the changed information in the light information provider 140 S83.

In another embodiment of the present disclosure, when, from a result of the comparison, the characteristic information is different from the intensity of the external light or the on/off time-point of the external light sensed by the optical sensor 111 S82, instead of unconditionally storing the characteristic information of the external light as sensed into the light information provider 140, the robot controller 900 temporarily stores characteristic information of the external light sensed in real time. Then, when the data are accumulated regularly enough to be stored in the light information provider 140 in a changed manner, the temporarily stored characteristic information of the external light may be stored in the light information provider 140.

In accordance with embodiments of the present disclosure, when sensors constituting the depth camera 110 of the depth sensing module 100, for example, infrared IR sensors are used outdoors or in a space where a lot of sun-light or light from lighting devices are introduced, in an environment where the sun-light is reflected, the sensors senses the depth values in a distorted manner, the distorted depth value may be filtered to generate normal depth information.

In particular, in large open areas such as airports, schools, hospitals, express bus terminals, train stations, etc. a lot of windows are present, a lot of lighting devices are arranged. Thus, light may be subjected to reflection or transmittance and thus be incident into the depth camera 110. This external light affects the sensing of the depth camera 110. In accordance with the present disclosure, in such an environment, the depth camera 110 may analyze the depth values as affected by the external light and filter the depth values distorted due to the external light and identify the distorted value as the garbage value.

In particular, according to the embodiment of the present disclosure, because the light information provider 140 provides information on the occurrence of external light, such as light from lighting devices or sun-light based on time and place, and context, the robot may determine whether to filter the depth value or use the same at it is based on the state of the external light.

Next, an example in which an image control scheme varies based on a state of external light will be described in FIG. 18 to FIG. 30.

According to the present disclosure, the robot having the image acquisition module combined thereto has a specific purpose such as cleaning, security, monitoring and guidance, or provides a service based on the characteristics of the space where the robot travels, and includes a driver. Therefore, a robot according to the present disclosure may collectively refer to an apparatus that travels using predefined information and sensors and provides a predefined service.

Figure 18:
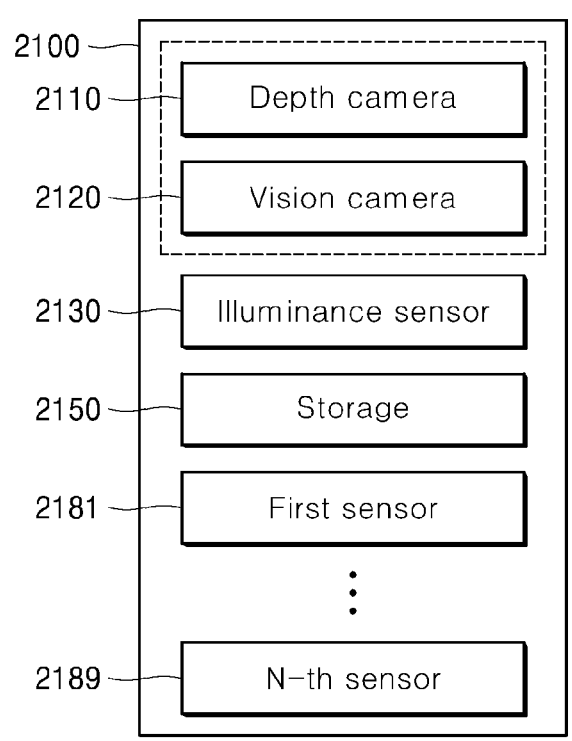
FIG. 18 illustrates components of a sensing module according to an embodiment of the present disclosure.

FIG. 18 illustrates components of a sensing module according to an embodiment of the present disclosure. The sensing module 2100 refers to a device that senses image information of an object in a space where an apparatus equipped with the module, for example, a robot travels. The sensing module 2100 includes at least one of a depth camera 2100 which detects the depth image information (depth information) of the object and calculates the distance of the object, and a vision camera 2120 which senses a color of the object to generate color (RGB, Red/Green/Blue) image information and calculates a shape of the object.

The vision camera 2120 may capture an image of surrounding objects. In particular, the vision camera 2120 may sense an image having a stationary object, and an image having a moving object. As a result, the vision camera may identify the moving object. For example, the sensing module 2100 may compare the color information generated by the vision camera 2120 over a predefined time and may identify a travel of an object having a specific shape based on the comparison result.

An illuminance sensor 2130 senses external light, and senses the illuminance of the external light and may sense the illuminance in a direction in which the image is sensed by the depth camera 2110 and/or the vision camera 2120. In one embodiment, the illuminance sensor 2130 senses strong light such as sun-light. In a process where the sensing module 2100 detects a depth image or a color image, when depth or color distortion occurs due to external light such as the sun light, an error may occur in extracting a feature point based on a color of an external object or extracting a distance to the object based on depth information. Therefore, the illuminance sensor 2130 senses the intensity (illuminance) or other characteristics of the sensed light and provides the same to a controller 2900 of a robot 2000 which will be described later.

The controller 2900 of FIG. 19 to be described later identifies a filtering target region from depth information sensed by the depth camera 2110 based on image control activation or deactivation. Alternatively, the controller 2900 compares color information sensed by the vision camera 2120 and identifies the filtering target region or selects a feature set, based on image control activation or deactivation. Whether or not to activate the image control is controlled by the controller 2900. The image control may be activated depending on an intensity of the external light as sensed by the illuminance sensor 2130. Alternatively, filtering may be activated based on non-optical information acquired by the controller 2900. The non-optical information includes time information such as current time, season, position information such a current position of the robot including the sensing module 2100, and object information, that is, information on whether an external object is sensed by a plurality of sensors (first to N-th sensors 2181 to 2189).

Storage 2150 stores therein image information (depth information and color information) sensed by the depth camera 2110 or the vision camera 2120.

In addition, the sensing module 2100 includes a plurality of sensors (first to N-th sensors) 2181 to 2189. Examples of sensors include ultrasonic sensors, lidar sensors, infrared sensors, heat sensors, and cliff sensors. The sensors sense the objects around the robot having the sensing module 2100 mounted thereon using ultrasonic waves, lasers, and infrared rays.

These sensors 2181 to 2189 sense the external objects and provide a sensing controller 2900 with the sensed information. In one embodiment, the lidar sensor may calculate the material and distance of external objects such as walls, glass, and metallic doors at a current position of the robot based on the signal intensity and the reflection time (velocity). The ultrasonic sensor may sense the presence or absence of objects disposed within a predefined distance from the robot. These sensors 2181 to 2189 provide the auxiliary sensed information needed to create a map or sense an external object. Further, these sensors 2181 to 2189 may sense externally placed objects as the robot travels and provide the sensed information to the robot.

The controller 2900 may provide the distance information sensed by the sensors 2181 to 2189 to the depth camera 2110 or the vision camera 2120. Then, the depth camera 2110 or the vision camera 2120 may refer to the distance information in the process of filtering the depth information or the color information. For example, when the sensors 2181 to 189 detect that there are no objects within 5 meters from the robot, the sensors 2181 to 189 provide the detected information to the sensing controller 2900. The controller 2900 may provide this information to the depth camera 2110 or vision camera 2120.

When the depth camera 2110 acquires the sensed information indicating that no object exists within 5 meters from the robot, but when a depth value (a depth value of a specific pixel is in depth image information) of an object within 5 meters from the robot is sensed, it may be identified whether the corresponding depth value of the depth cell is distorted due to the external light. If so, the depth value may be filtered.

Similarly, when the vision camera 2120 acquires the sensed information indicating that an object does not exist within 5 meters from the robot, but when a color value of a specific shape of an object within 5 meters from the robot is sensed in the sensed image information, it may be identified whether the color value of the corresponding cell is distorted due to the external light. If so, a feature set including the color value of the corresponding cell may be stored. SLAM (Simultaneous localization and Mapping may be performed based on the feature set.

Figure 30:
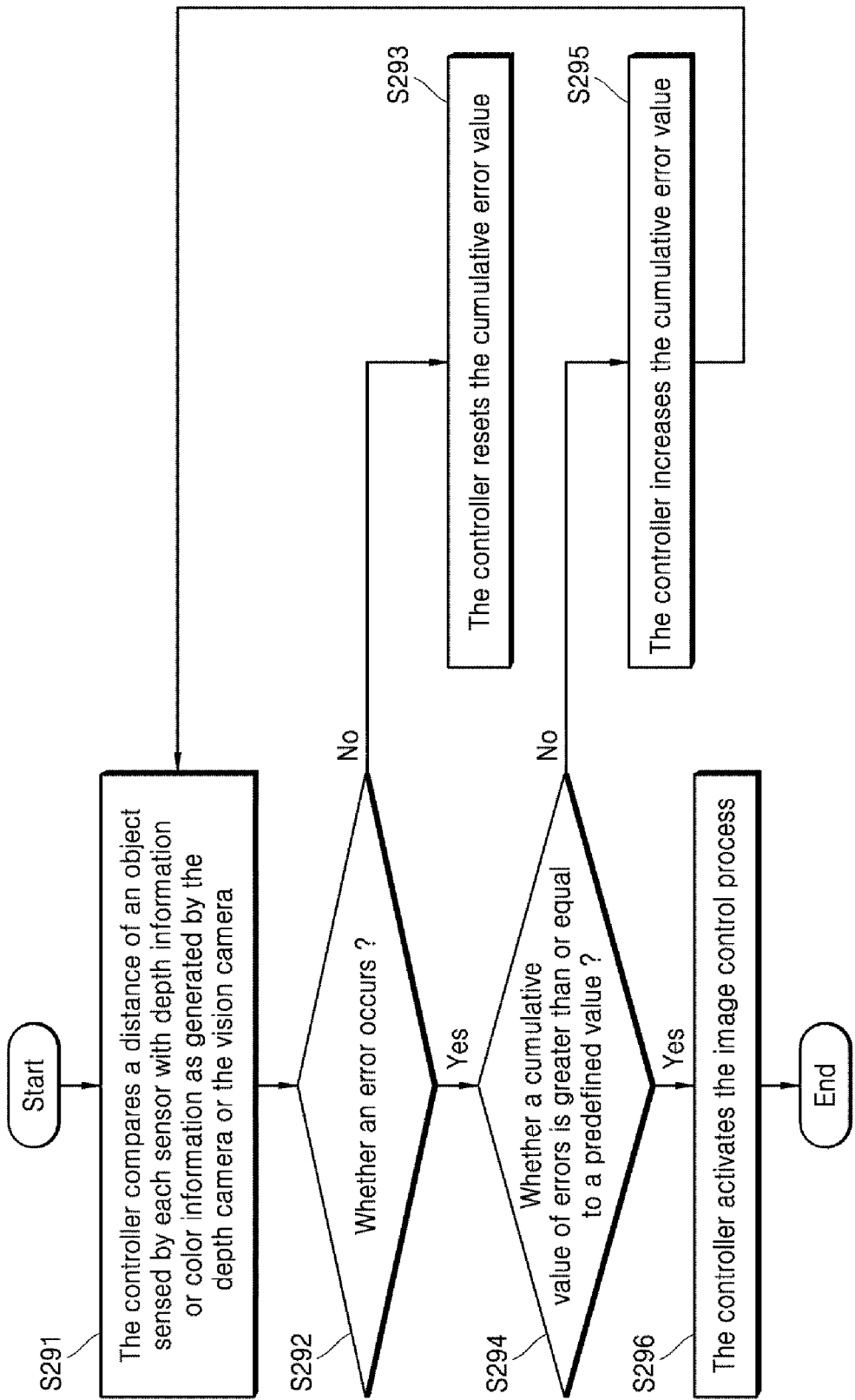
FIG. 30 illustrates a process for controlling an image control process according to an embodiment of the present disclosure.

The controller 2900 analyzes the information sensed by the sensors and the cameras 2110 and 2120. For example, when an object placed around the robot is detected by multiple sensors, each sensor may provide information on the characteristics and distance of a corresponding object to the controller. The controller 2900 may combine the characteristics and distances with each other to calculate a resulting combination and determine whether an error occurs in the accuracy of the values sensed by the cameras 2110 and 2120 based on the resulting combination. When an error occurs in accumulated values as sensed by the cameras 2110 and 2120, the controller 2900 may identify that filtering is necessary. This is illustrated in FIG. 30.

Figure 19:
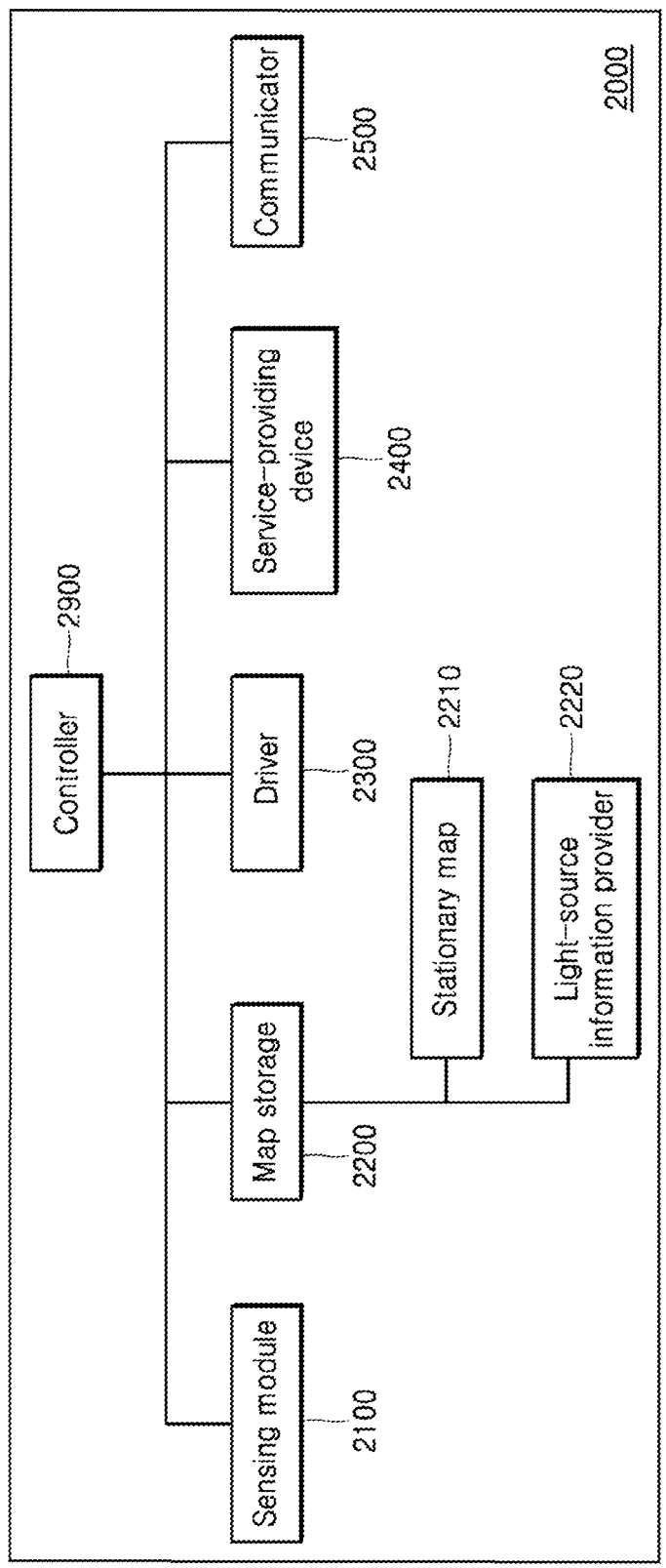
FIG. 19 shows a configuration of a robot according to an embodiment of the present disclosure.

FIG. 19 shows a configuration of a robot according to an embodiment of the present disclosure. The robot 2000 includes a sensing module 2100 as discussed earlier. Other components of the robot may include map storage 2200 including information on objects placed in a space in which the robot travels, a driver 2300 to move the robot 2000, and a service-providing device 2400 to provide a specific service, and a communicator 2500.

FIG. 19 shows a hierarchical configuration of the robot. This is intended for logically representing the components of the robot. Thus, a physical configuration of the robot may be different from the logical representation of the components. A plurality of logical components may be included in one physical component. Alternatively, a plurality of physical components may implement one logical component. Further, the hierarchy in FIG. 19 does not necessarily have to be maintained. The skilled person may change the hierarchy freely.

The driver 2300 may be configured to move the robot 2000 and may include a wheel. The driver 2300 moves the robot 2000 under control of the robot controller 2900. In this connection, the robot controller 2900 may identify a current position of the robot 2000 in a region stored in a map storage 2200 and may provide a travel signal based on the current position to the driver 2300. The robot controller 2900 may generate a route in real time using various information stored in the map storage 2200 or may generate a route during travelling.

The service-providing device 2400 may be configured to provide a specialized service of the robot. For example, when the robot acts as a cleaning robot, the service-providing device 2400 includes components necessary for cleaning. When the robot acts as a guide robot, the service-providing device 2400 includes components necessary for guidance. When the robot acts as a security robot, the service-providing device 2400 includes components necessary for security.

The service-providing device 2400 may include various components according to the service provided by the robot. The present disclosure is not limited thereto. The communicator 2500 may be configured for transmitting information obtained by the robot to an external server or other robots, or receiving information from the aforementioned server or other robots.

In particular, the communicator 2500 may receive information about a current weather from external devices and identify, based on the information, whether in a current condition, strong external light such as a sun-light occurs. The communicator 2500 may provide the identification result to the robot controller 2900. Then, the robot controller 2900 may provide the condition at which the external light occurs to the depth sensing module 2100 so that the condition may be applied to filter the depth information.

The controller 2900 of the robot 2000 may create or update a map on the map storage 2200. Further, the controller 2900 may combine sensed information provided by the sensing module 2100 during the travelling of the robot, and then control the travel path of the robot based on the combined sensed information. That is, the controller 2900 may identify objects around the robot based on the depth image, color image and distance information as sensed by the sensing module 2100 and controls the travel path of the robot 2000 based on the identified object.

Referring to the robot based on the configuration of FIG. 18 and FIG. 19, the sensing module 2100 senses illuminance in a direction in which the depth camera 2110 or the vision camera 2120 senses an image. The sensing module 2100 may further include an illuminance sensor 2130 to sense an illuminance.

The map storage 2200 stores therein information about objects placed in the space where the robot travels. The map storage 2200 may include a stationary object map 2210 that stores information about stationary objects such as walls and doors, and optionally, light-source information storage 2220. The light-source information storage 2220 stores therein information about a window's position or window's characteristic when a separate lighting device is placed on a ceiling or wall, or when the robot is exposed to light through a ceiling window. In an embodiment, the information may include a position where the light source is sensed and intensity (illuminance) of the light source.

The controller 2900 may combine the illuminance sensed by the sensing module 2100, the object information of the map storage 2200, and the position and time information of the robot and may apply a filter of the depth camera 2110 or the vision camera 2120 based on the combination. In one embodiment, when the illuminance sensed by the illuminance sensor 2130 is higher than a predefined level, the controller 2900 may control the sensing module 2100 to store and filter image information sensed by cameras 2110 and 2120, or to control the depth camera 2110, the vision camera 2120, and the storage 2150 to select a feature set.

Briefly, the controller 2900 combines one or more of the illuminance sensed by the illuminance sensor and the information of the object stored in the map storage or the object information sensed by the sensing module, the position information and time information of the robot and then triggers the image control activation of the depth camera or vision camera based on the combination. In this connection, the image control activation based on the combination is intended to identify whether the illuminance sensed by the illuminance sensor is correct.

Although not shown in FIG. 19, the robot may extract and store a feature set from an image captured using the vision camera 2120. At least one feature set taken at a specific position corresponding to a position of the stationary object map 2210 may be stored for each position (per cell). In this process, when the illuminance of the external light is high, the feature set reflecting the external light may be stored separately in the stationary object map 2210. As a result, at least two feature sets may be acquired from the same cell.

The feature set may be selected or saved to perform SLAM depending on the state of the illuminance of the external light.

Based on the configuration shown in FIG. 18 and FIG. 19, the robot may accurately identify an object during traveling in a building in which outdoor brightness change occurs in the same manner. In order to prevent inaccuracy due to the external light and maintain accuracy, the depth camera 2110 or vision camera 2120 may combine the illuminance sensor 2130 with current time information and seasonal information, and the position of the light sources or the position information of the objects corresponding to the position of the robot and thus generate the depth information and the color information accurately based on the combination, or generate the depth information or the color information reflecting the external light intensity.

A configuration of the map storage in accordance with the present disclosure may be the same as described above with reference to FIG. 6. However, when a configuration of each of the map storage 220 and the stationary object map 2210 and the light-source information storage 2200 is applied, they are included in map storage 2200a as shown in FIG. 20.

Figure 20:
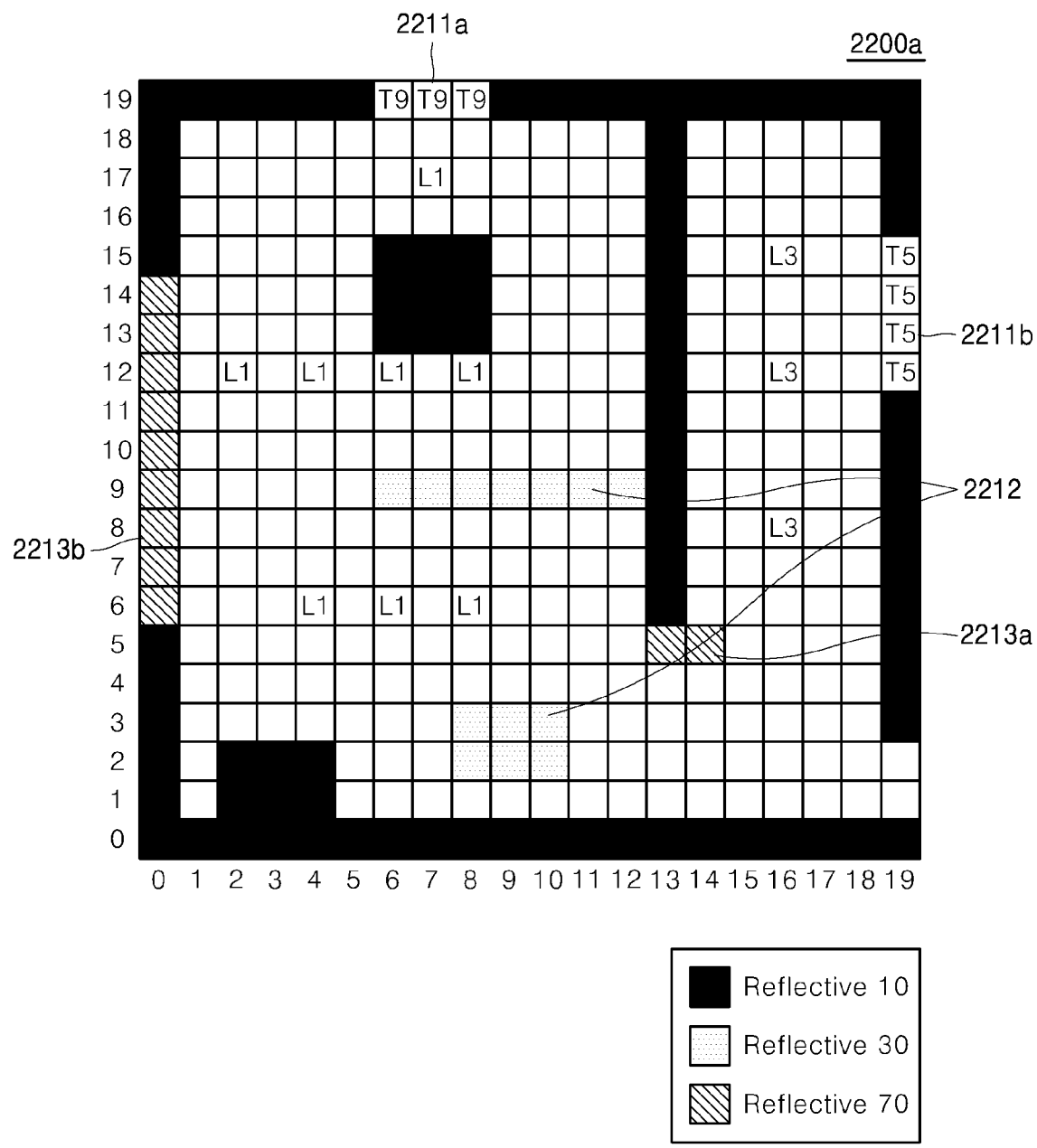
FIG. 20 illustrates a configuration of map storage according to an embodiment of the present disclosure.

FIG. 20 illustrates a configuration of map storage according to an embodiment of the present disclosure.

The map storage 2200 may integrate a stationary object map 2210 such as bitmap and light-source information storage 2220 and may store the integrated storage as shown in FIG. 20. The map storage 2200 may store therein a lot of bitmap information as shown in FIG. 20. In this process, the map storage may accumulate stationary object maps/light-source information over time therein. The map storage may be configured such that each bit in a bitmap of an image file represents one unit region. A left bottom unit region may define (0, 0) while a right top unit region defines (19, 19). Further, the map storage 2200a in FIG. 20 may have a 20×20 data structure. For example, information about whether an object is present at each position may be included in the data structure. Information may be arranged in a matrix manner. When a stationary object is disposed in a unit region, a value of the corresponding unit region may be set to a predefined value.

Further, the map storage 2200a may store characteristic information about reflective or transmissive properties of the stationary objects. The characteristic information about the object may be classified based on categories and stored in the map storage 2200a. In the map storage 2200a in FIG. 20, a black area shows that a light reflectance value of an object is 10, thus, a reflective property of light of the object is low.

Other stationary objects as indicated by 2212 have a light reflectance of 30 and thus reflect the external light by 30%. Stationary objects as indicated by 2213a and 2213b have a light reflectance value of 70 and reflect the external light by 70%. A category of the light reflectance of stationary objects may be defined in various ways. The present disclosure is not limited thereto.

In one example, a combination of T and number in unit region indicates a transmittance of a stationary object therein. For example, "T9" indicated by 2211a indicates that a stationary object made of a transparent material that transmits 90% or greater of light, for example, a transparent glass window is disposed in a corresponding unit region. As a result, when the depth camera 2110 or vision camera 2120 travels toward a region 2211a when the sun rises, the controller 2900 may identify that sun-light affects calculation of depth/color information.

"T5" indicated by 2211b means that a stationary object made of translucent material, for example, a translucent glass window which transmits 50% of light is disposed in a unit region.

L1 or L3 on the map storage 2200a indicates a point where a lighting device may be placed or a space in which light may be emitted from a ceiling. L1 or L3 could be a label categorizing a ceiling window or a lighting device. In one embodiment, L1 or L3 may be an illuminance of a lighting device, a light intensity related to a window transmittance, or a group name of lighting devices in a specific category.

When L1, L3, or etc. indicates an intensity of sun-light incident through the ceiling window or an illuminance of the lighting device, L may be defined based on a category. In one embodiment, L may be defined to be 1 to 5 based on a category. In an embodiment of FIG. 20, external light L1 has an intensity corresponding to a category "1". External light L3 has an intensity corresponding to a category "3".

In one embodiment, when the ceiling is made of a transparent glass, the ceiling may be categorized as having a high transmittance. When the ceiling is made of an opaque glass, the ceiling may be categorized as having a low transmittance.

In another embodiment, in addition to the intensity of the external light or the illuminance of the lighting device, lighting devices may be grouped and categorized. For example, lighting devices that are turned on or off at the same time may be grouped and categorized to have a label L1 or L2.

L1 and L3 provide specific information of external light such as an intensity of sun-light incident through a window of a ceiling, a group of a lighting device, or a illuminance of a lighting device, whereas more detailed external light information, such as a time when the sun-light shines or a context (weather, latitude, longitude, etc.) in which the sun-light shines, an on/off period at which the lighting device is turned on and off, or a context in which the lighting device is turned on and off (e.g., a condition in which the lighting device is turned on) may be stored in the map storage 2200.

In FIG. 20, information about a reflectance level at which a material of a floor reflects light may be stored in the map storage 2200. For example, as shown in the table 1 above, information about a reflectance level of the floor may be stored in each specific region of the map storage 2200a.

In the above table 1, (0, 0) defines a left-bottom region while (19, 19) defines a right-top region. Regions corresponding to (0, 0) to (19, 19) may correspond to a category "50". Thus, information indicating that light may be reflected from the floor may be considered in a process of filtering a depth value sensed by the depth camera 2110 or of selecting a feature set as sensed by the vision camera 2120. Alternatively, a space may be subdivided as follows, and reflection information of the floor may be presented as shown in the above Table 2.

When traveling in a first region defined by (0, 0) to (19, 10) in the above Table 2, the robot may consider the information that a reflectance is 50 and thus may filter the depth information or select a feature set of color information in a space having a category in which a reflectance of the floor is 50. Further, when traveling in a second region defined by (0, 11) to (19, 19), the robot may consider the information that a reflectance is 20 and thus may filter the depth information or select a feature set of color information in a space having a category in which a reflectance of the floor is 20.

When applying the configuration of the robot as described, the operation scheme of the depth camera 2110 and the vision camera 2120 may vary according to the brightness of the surrounding environment thereby to calculate the depth/color information more accurately. In particular, in a process in which the robot captures an image while a robot travels in airports, terminals, harbors, schools and outdoors, etc., the sensing may be affected by a change in brightness due to a glass structure, a structure having a larger amount of received light, or outdoor environment.

In particular, in accordance with the present disclosure, the depth camera 2110 may be prevented from misunderstanding a structure from which the sun-light reflects as an obstacle. That is, the robot may apply a filtering process to the depth camera 2110 to increase sensing accuracy of depth information.

Further, the vision camera 2120 generating vision information, that is, color (RGB) information may store a feature point visible to the camera as a feature and may perform position recognition based on the feature. This process may be referred to as vision SLAM. In the vision SLAM process, even in the same location, the feature may be detected differently depending on the brightness of the surroundings. Thus, it is necessary to store the feature point into different locations of the storage based on the brightness of the surroundings.

Therefore, according to the present disclosure, the combination of current time or season information, robot position information, external obstacle object information, etc. may be used together with an illuminance value sensed by the illuminance sensor 2130. In this way, the presence or absence of filtering of the depth camera 2110 may be accurately determined, and a feature set in the vision SLAM may be selected. Thus, the robot may travel without errors or delays.

Figure 21:
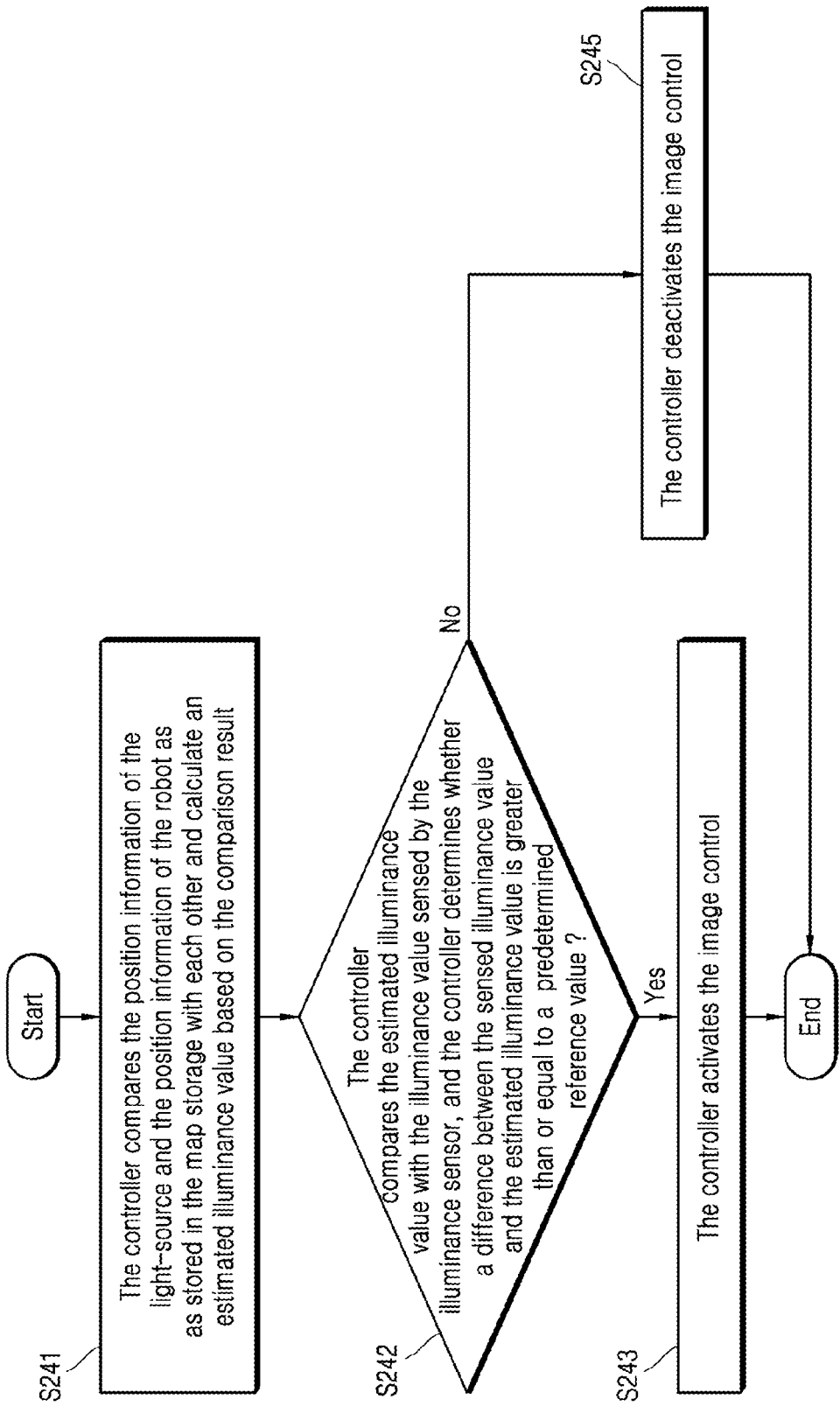
FIG. 21 illustrates a process of performing image control activation using a distance to a light-source, and a sensed illuminance value based on position information according to an embodiment of the present disclosure.

FIG. 21 is a diagram illustrating a process of performing image control activation using a distance to a light source, and a sensed illuminance value based on position information according to an embodiment of the present disclosure.

The controller 2900 of the robot may identify whether light-sources or reflected light are present at a current position of the robot and may increase or decrease the accuracy of the sensed illuminance based on the identification result. In this connection, the light-source includes a sun-light that penetrates a window placed on a ceiling or wall. When a luminance of light as sensed by the illuminance sensor is Lum_01, and a luminance of light from light sources including lighting devices, light via reflection, or light passing through a window placed around the robot is within an error range from Lum_01, the sensed illuminance is determined to be correct.

As a result, the illuminance data and position information may be combined with each other and then image control may be performed based on the combination.

More specifically, the controller 2900 may compare the position information of the light-source and the position information of the robot as stored in the map storage 2200 with each other and calculate an estimated illuminance value based on the comparison result S241. The estimated illuminance value refers to the influence of light that the robot may receive at a corresponding position thereof. For example, the estimated illuminance value may be calculated based on the illuminance (the intensity) of light from the light source and the distance between the light source and the robot. When the illuminance is high and the robot is close to the light source, the estimated illuminance value increases. On the contrary, the estimated illuminance value decreases when the illuminance is high, but a direction in which the robot's depth camera or vision camera senses an image is different from a direction in which the robot faces the light-source (window and lighting device). Thus, the controller 2900 may compare a direction in which the robot's depth camera or vision camera senses an image with a direction in which the robot faces the light-source (window and lighting device), and may more accurately estimate the effect of the illuminance of the light that the robot may receive, based on the comparison result. The estimated illuminance value may not be greater than the illuminance of the light source and may decrease as the distance between the light source and the robot increases.

Next, the controller 2900 compares the estimated illuminance value with the illuminance value sensed by the illuminance sensor 2130 S242. For example, the controller may identify whether a difference between the sensed illuminance value and the estimated illuminance value is greater than or equal to a predetermined reference value. When, from a result of the identification, the above-mentioned difference is larger than the reference value, it is determined that strong external light is present due to another light source placed externally to the robot or an increase in illuminance of the light source. The controller may activate the image control S243. As a result, the depth camera 2110 may perform filtering. The vision camera 2120 may select a separate feature set from the acquired image.

In another example, when the estimated illuminance value is compared with the detected illuminance value, the difference between the sensed illuminance value and the estimated illuminance value is smaller than or equal to the predetermined reference value. In this case, the illuminance as actually measured is lower than the estimated value. Thus, the sensed illuminance values may be accumulated continuously over time. In particular, when the image control is already activated, the illuminance value as sensed may be low. In this case, the controller 2900 may deactivate the image control S245.

In one example, when the difference between the sensed illuminance value and the estimated illuminance value is within a predefined range, the controller 2900 may determine that all of the sensed illuminance values originate from a specific light source, and thus may apply the position information of the light source to the image activation process.

Figure 22:
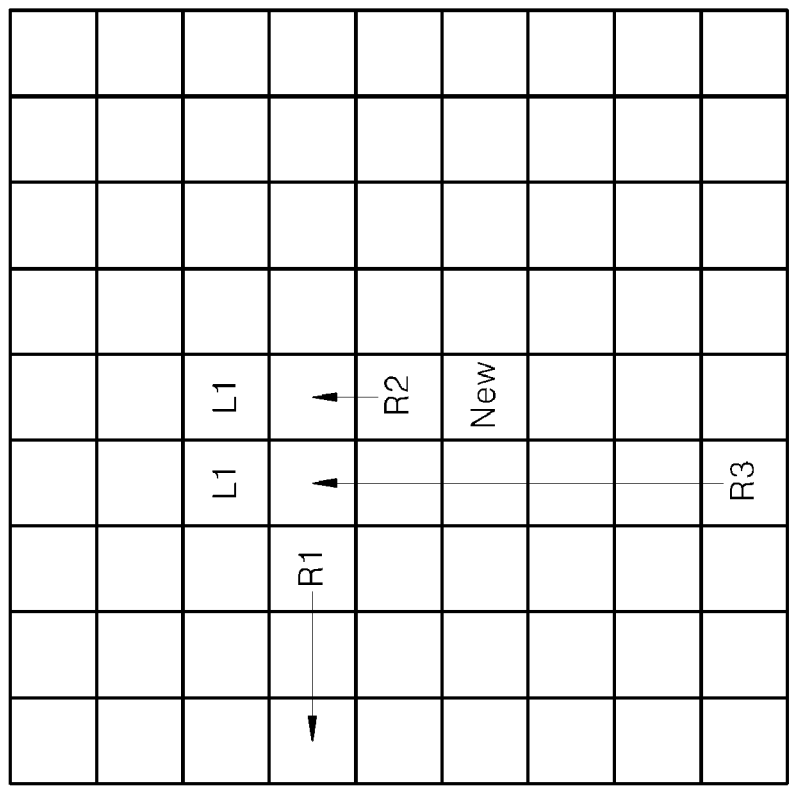
FIG. 22 shows a process for calculating an estimated illuminance value based on a distance between a robot and a light-source according to one embodiment of the present disclosure.

FIG. 22 shows a process for calculating an estimated illuminance value based on a distance between a robot and a light-source according to one embodiment of the present disclosure. FIG. 22 summarizes a space where the robot travels. L1 shows that a light-source belonging to a first category is disposed in a corresponding cell. The robot at a position R1 travels in a direction as indicated by a left arrow. The robot travels in a left direction. Thus, two light sources are placed in rear of the R1 robot. Therefore, the illuminance value sensed by the robot at the position of R1 is unaffected by the light source L1.

When the sensor senses an illuminance and the light source is placed around the robot, the light source is not disposed in front of the robot when the robot progresses in a front direction. That is, the sensor may acquire the image in a direction other than the front direction. In this case, only when an illuminance value sensed by the robot is higher than a predefined level, the controller 2900 of the robot may identify that the robot receives light from a new light-source. On the contrary, the sensed illuminance value is equal to or lower than the estimated illuminance value, and the sensed illuminance value is low compared to an illuminance reference value acting as a reference for activating the image control, the controller 2900 may acquire an image without reflecting the sensed illuminance.

In one example, the robot at a position of R2 is traveling upwards, that is, toward the light-source. In the travelling process, the robot senses the illuminance. The sensed illuminance value as a light intensity of the light source disposed in front of the robot when the upward travel direction is a front direction of the robot may be equal to or higher than the estimated illuminance value. In this case, the controller 2900 of the robot may activate the image control in consideration that the illuminance value sensed by the new light source is high or based on the estimated illuminance value of the existing light source. As described above, the depth camera 2110 may perform filtering. The vision camera 2120 may select a separate feature set from the acquired image based on the increased illuminance value.

When the illuminance sensed while the robot is present at the position of R2 is much lower than the estimated illuminance value, the robot may identify that the corresponding light source is not operating. The controller 2900 may continuously accumulate illuminance values as sensed on the map and may store an illuminance value in each region in a separate location of the storage. The accumulated storage of the sensed illuminance values provides information necessary for subsequent light-source information update or necessary when the depth camera 2110/vision camera 2120 perform subsequent filtering/feature set selection.

In one example, the robot at the position of R3 is traveling toward the light-source. However, unlike the situation where the position of the robot is R2, a distance to the light-source is larger. Therefore, the controller 2900 of the robot at the R3 position may identify that the illuminance value as sensed gradually increases over time when there is no change in the travel direction. When, in this process, the illuminance value as sensed suddenly and greatly increases, the controller 2900 identifies that a new light source appears. The controller may activate the image control process.

For example, a new light-source may appear in a region marked "New" in the figure. People who travel may turn on a flash or a new light source may be disposed. The controller 2900 expects that the estimated illuminance value increases based on the distance to the L1 light source. In this case, the illuminance value sensed by the illuminance sensor 2130 increases significantly due to the appearance of the new light source. Thus, the controller may trigger the image control activation.

In summary, the controller 2900 decreases the estimated illuminance value as the distance to the light source L1 decreases. In a situation in which the estimated illuminance value increases by 1, the illuminance sensor 2130 may sense an actual illuminance value larger than a value corresponding to a rate at which the estimated illuminance value increases. For example, the estimated illuminance value increases as 10→11→12 in a regular manner. However, when 20 of an illuminance value is detected due to the appearance of the new light source, the controller 2900 identifies the significant illuminance change and triggers the image control activation. For example, the controller 2900 may activate the image control process. Thus, the depth camera 2110 may perform filtering. The vision camera 2120 may select a separate feature set from the acquired image based on the increased illuminance value.

The above-described embodiment is particularly suitable when performing the filtering/feature set selection only when a light source is sun-light. A lighting device is not as strong as the sun-light even though a brightness of the light device is higher than a predefined level. Thus, the robot may be configured not to perform a separate filtering/feature set selection process when the external light source is such a lighting device.

Figure 23:
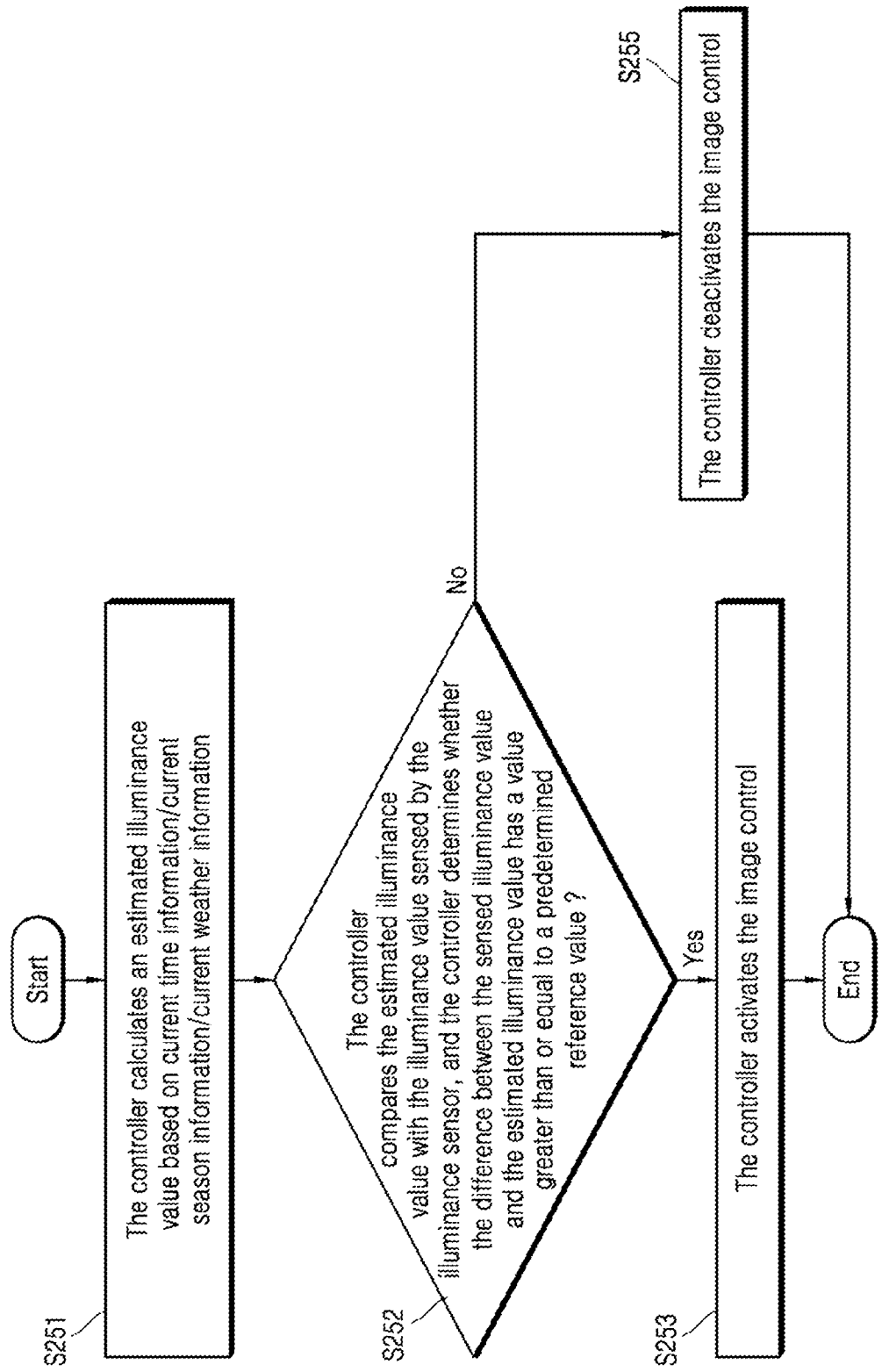
FIG. 23 illustrates a process of performing image control activation using time information and a sensed illuminance value according to an embodiment of the present disclosure.

FIG. 23 illustrates a process of performing image control activation using time information and sensed illuminance value according to an embodiment of the present disclosure.

In FIG. 21 and FIG. 22, the robot compensates for the accuracy of the illuminance as sensed by the illuminance sensor 2130 based on the position of the light-source, for example, a position of a window through which the sun-light passes or a position of a strong lighting device. Then, the sensing module performs the filtering or feature set selection/storage based on the compensated accuracy. In FIG. 23, the controller may compare the illuminance value sensed by the illuminance sensor with the estimated illuminance value that may be estimated at the current time, and may perform the image control activation when the detected illuminance is higher than the estimated illuminance value.

In one embodiment, the controller 2900 calculates an estimated illuminance value based on the current time or based on current season information or weather information. The seasonal information may be stored in a separate memory in the controller 2900. The robot stores a light intensity (illuminance value) based on each season into database. Further, the controller 2900 may calculate an estimated illuminance value based on the weather information received via the communicator 2500 in real time.

Accordingly, the controller 2900 calculates an estimated illuminance value based on various information that may be used to estimate an intensity of current external sun-light, current time information, current season information, current weather information, and the like S251. The estimated illuminance value refers to an influence level of light that may be applied to the robot, based on the seasonal and weather conditions at the current time. In a season when the sun-light is strong, the estimated illuminance value increases. On the contrary, even at a season when the illuminance is strong but when the image sensing direction of the robot's depth camera or vision camera is different from a direction in which the robot faces the light source such as a window or a lighting device, the estimated illuminance value decreases. When comparing the image sensing direction with the direction in which the robot faces the light source with each other, the controller 2900 more accurately estimates the effect of the illuminance to be applied to the robot based on the comparison result. The estimated illuminance value may not be greater than the illuminance of the light source and may decrease as the distance between the light source and the robot increases.

Next, the controller 2900 compares the estimated illuminance value with the illuminance value sensed by the illuminance sensor 2130 S252. For example, whether the difference between the sensed illuminance value and the estimated illuminance value has a value greater than or equal to a predetermined reference value is identified. When, from a result of the identification, the above-mentioned difference has a value greater than or equal to the reference value, the controller 2900 determines that a new light-source is placed or the intensity of the sun-light is increased and activates the image control process S253. As a result, the depth camera 2110 may perform filtering. The vision camera 2120 may select a separate feature set from the acquired image.

In one example, when the estimated illuminance value is compared with the sensed illuminance value and then the difference therebetween has a value smaller to the reference value, the illuminance as actually measured is lower than the estimated value. Thus, the illuminance sensing values may be accumulated continuously over time. For example, when the illuminance value as sensed is low when the image control is already activated, the controller 2900 may disable the image control process S255.

The controller 2900 may apply a weight to the weather information, the seasonal information, and the time information such that they may be selected according to a priority. For example, the controller 2900 may determine, based on the seasonal and time information, that the light sensed by the illuminance sensor 2130 is originated from a lighting device at a time-point at which the sun does not rise. When the light is determined to be originated from the lighting device, the controller 2900 may disable the image adjustment. The controller may enable the image control only when a lighting device has a very strong illuminance.

Figure 24:
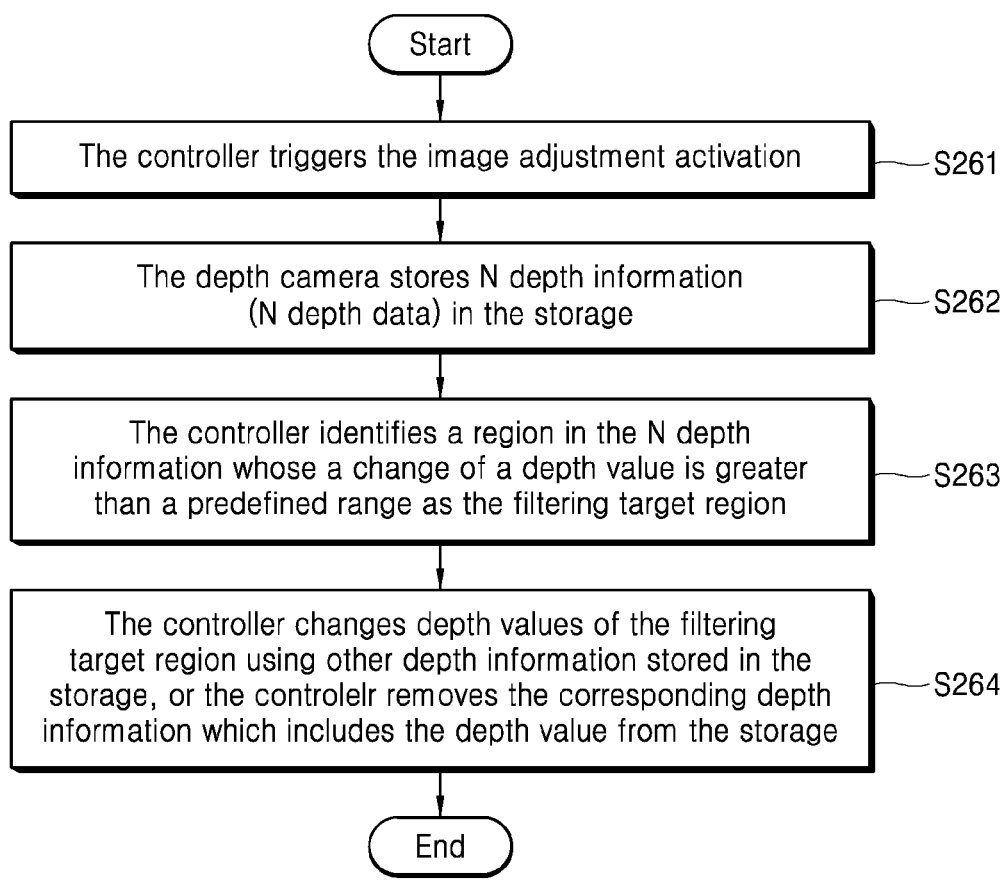
FIG. 24 illustrates a process in which a depth camera performs filtering under control of an illuminance sensor according to an embodiment of the present disclosure.

FIG. 24 illustrates a process in which a depth camera performs filtering under control of an illuminance sensor according to an embodiment of the present disclosure.

FIG. 24 illustrates a process of filtering a depth value in depth information in a process in which a robot accumulates and stores the depth information according to an embodiment of the present disclosure. In FIG. 24, after the filtering has been triggered, the depth camera 2110 detects N depth information for a predefined time, and identifies and corrects or removes specific depth information having an error due to the influence of external light.

As in FIG. 21 to FIG. 23, when an illuminance value sensed by the illuminance sensor 2130 indicates that the external light (sun-light and lighting device) has an illuminance greater than a predefined level, the controller may trigger the image control activation S261. In one embodiment, the image control activation may include filtering the depth information. This includes storing depth information over time, changing depth values of some cells, or removing depth information at a specific time-point.

The depth camera 2110 stores N depth information (N depth data) in the storage S262. For example, N may be a natural number equal to or larger than 1. For example, five depth information may be stored in the storage 2150 in a queue manner.

The controller 2900 identifies a region in the N depth information whose a change of a depth value is greater than a predefined range as the filtering target region S263. For example, the controller 2900 examines five queues and compares depth cell-based depth values of the depth information with each other. When the depth value changes between adjacent frames by a predefined distance (for example, 100 mm), the depth value is determined as a garbage value and is not used.

Further, the controller 2900 may identify regions having large changes in depth values as filtering target regions. The above-mentioned reference distance may be calculated in consideration of the travel velocity of the robot and a time at which the depth information is generated. For example, when assuming that the travel velocity of the robot equipped with the depth camera 2110 is 500 mm/s and a human travel velocity is 1000 mm/s, a distance 1500 mm between the person and robot may occur in one second. In this connection, when the depth camera 2110 generates depth information at a 33 mm/s rate, this means that the depth camera generates depth information about 30 times per second. This is because 1500 mm/30=about 50 mm/frame.

Therefore, when depth information of a single current frame is compared with depth information of a previous frame or a subsequent frame, a difference between depth values between the single current frame and previous frame or subsequent frame may not be larger than 50 mm. The image control has been activated in S261. Thus, when a change in the depth value is large, the controller 2900 may determine that the changed depth value is not an actual depth value of an object but the depth value has changed due to the intensity of the external light.

Thereafter, the controller 2900 may set depth values of depth cells constituting the filtering target region using other depth information stored in the storage 2150. Alternatively, when the depth values of all depth cells in the specific depth information have errors due to the sun-light, the corresponding depth information may be removed from the storage 2150 S264. Alternatively, only depth information of a specific depth cell may be removed from the storage 2150 and may not be used. The depth information of the depth cell and configurations of the depth information are the same as shown in FIG. 2 and FIG. 3. The depth information of the depth image for each frame as generated by the depth camera 2110 may vary as shown in 11 to 13 of FIG. 3. In one embodiment, the depth information in FIG. 3 is a set of depth values constituting a depth image captured at one time-point, that is, at one frame, as acquired by the depth camera 110. Further, when the filtering is applied, the controller 2900 may analyze a specific depth value of corresponding cell among accumulated depth information whose change is greater than a pre-defined reference value, and determine whether the changed specific depth value is a garbage value due to influence of the external light. Then, if so, the controller 2900 may extract the specific depth value from depth information of a previous or subsequent depth image, that is, from a depth image of a previous frame or a subsequent frame. Then, the controller 2900 may correct the specific depth value such that the garbage value due to the external light may be removed. Thus, depth information reflecting a correct depth value of an object may be calculated. This has been previously described.

Figure 25:
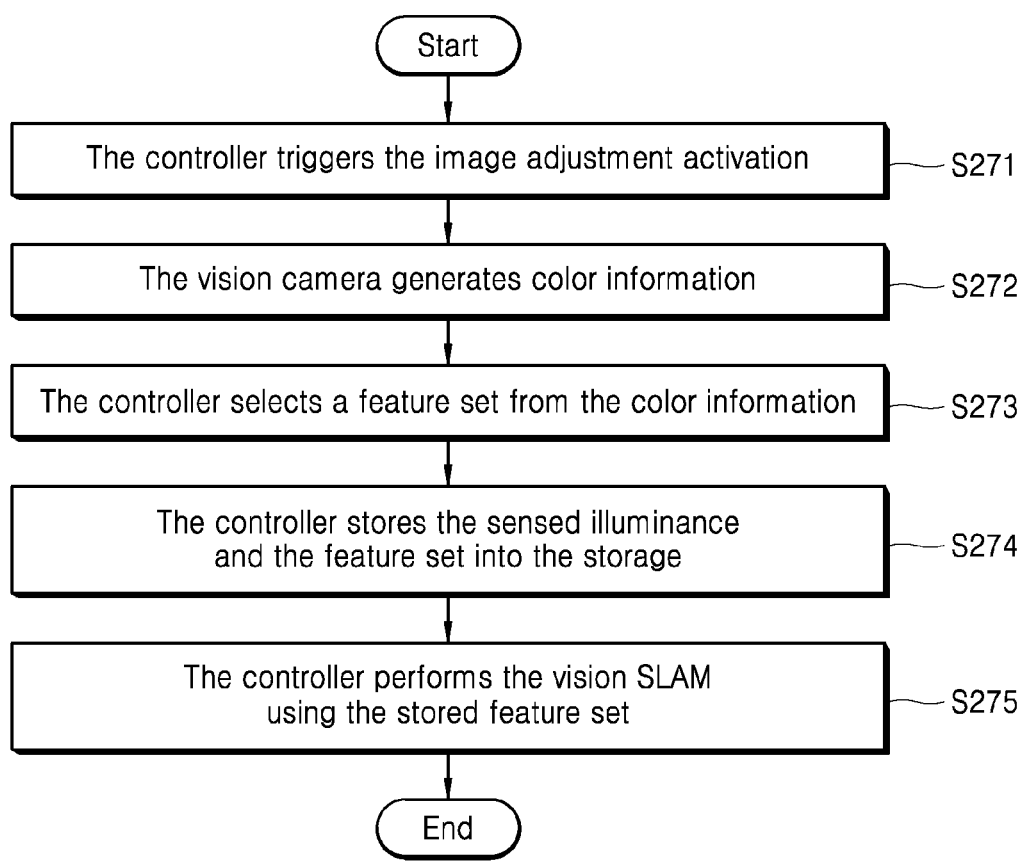
FIG. 25 illustrates a process of selecting or storing a feature set in a process in which a robot accumulates and stores color information or performing a vision SLAM using the feature set according to an embodiment of the present disclosure.

FIG. 25 illustrates a process of selecting, storing, or using a feature set to perform a vision SLAM in a process in which a robot accumulates and stores color information according to an embodiment of the present disclosure.

As in FIG. 21 to FIG. 23, when an illuminance value sensed by the illuminance sensor 2130 indicates that the external light (sun-light and lighting device) has an illuminance greater than a predefined level, the controller may trigger the image control activation S271. In one embodiment, the image control activation may include selecting a new feature set based on a current illuminance state or generating color information and storing a feature set based on the color information.

First, the vision camera 2120 generates color information S272. In one embodiment, the color information includes an image file including RGB values for each pixel. The color information includes the RGB values of an image acquired by the vision camera 2120. When the external illuminance is strong, the RGB values may change.

Thus, the controller 2900 selects a feature set from the color information based on the RGB values of the image acquired by the vision camera 2120 S273. For example, meta-information "chair" in an image identified as a chair edge may constitute a feature set. Further, a recognized character in the color information having a character shape may be a feature set.

The controller 2900 stores the sensed illuminance and the feature set into the storage 2150 S274. Thereafter, the controller 2900 may perform the vision SLAM using the feature set and based on the newly stored specific illuminance S275.

FIG. 26 is a diagram in which a controller identifies color information of a vision camera based on illuminance according to an embodiment of the present disclosure. Referring to a process in which the vision camera 2120 senses the same region, the vision camera 2120 acquires an image having color information as indicated by 281. A letter E as a feature in the image is stored to be contained in a feature set as shown in 282. Because 281 and 282 have the same feature set acquired in a general illuminance situation, the illuminance information may be stored as "Normal" (see FIG. 27).

In one example, when the vision camera 2120 acquires an image while the light is strongly shining from the outside, the light may be reflected on an object as indicated by 283. Thus, unlike 281, a color other than an original color of the object is included in the image, that is, the color information 285. Both of the color information identified at 281 and the color information identified at 285 as captured by the vision camera 2120 are about the same object. However, both have different color information due to the external light.

The controller 2900 may select and store the feature set such as 282 and 286 which are different between the color information 281 and 285 which are about the same object. In this process, the feature set may be stored together with information about the illuminance (Normal, Bright), Thus, the controller 2900 may select a more accurate feature set in the vision SLAM process in a specific illuminance situation.

FIG. 27 shows information about a feature sets stored in the storage 2150 according to another embodiment of the present disclosure. Serial numbers 1 and 4 indicate the feature sets as acquired in a north ("N") direction from the same position (5, 11) respectively. The two feature sets are distinguished from each other based on an illuminance difference L1 (Normal-Bright).

When the controller 2900 detects a specific illuminance situation during the travelling of the robot, the feature set may be selected based on the corresponding illuminance. For example, when the light is not strong, the robot 2000 may perform the vision SLAM based on the feature set of the serial number 1 at the position (5, 11). On the contrary, when the light is strong, the robot 2000 may perform the vision SLAM based on the feature set of the serial number 4 at the same position (5, 11).

In accordance with embodiments of the present disclosure, the robot may filter the image sensed by the depth camera 2110 or vision camera 2120 or store a separate feature set in a space vulnerable to the external brightness change, such as outdoors or indoors in a glass structure. This process may use a combination of the current time and season, the position of the robot, and the sensed value of the illuminance sensor 2130 to select whether or not to perform fault/error filtering of the depth camera 2110, that is, to determine whether to activate the filtering process. In particular, the filtering may be selectively performed based on various variables such as the illuminance, position of robot, current time and season. Thus, the filtering time may be shortened and a sensing delay of the depth camera 2110 may be minimized. This improves an ability for the robot 2000 to cope with an obstacle. When the robot or controller 2900 uses only the current time or seasonal and position information, the illuminance situation may not be identified. However, according to an embodiment of the present disclosure, a problem caused in performing the filtering incorrectly may be solved.

Further, the vision camera 2120 may generate a feature sets in various illuminance situations, thereby allowing the robot to perform the vision SLAM even when the external brightness changes. In particular, the color information of the object sensed by the vision camera 2120 may vary due to the brightness of the external light. The robot may select different feature sets for the same object due to the variation of the color information for the same object. Therefore, the controller 2900 may use the feature set as previously extracted and stored by the vision camera 2120. Alternatively, the feature set as extracted by the vision camera 2120 may be newly stored to increase the accuracy of the position recognition in the vision SLAM process independently of the external light brightness.

Figure 28:
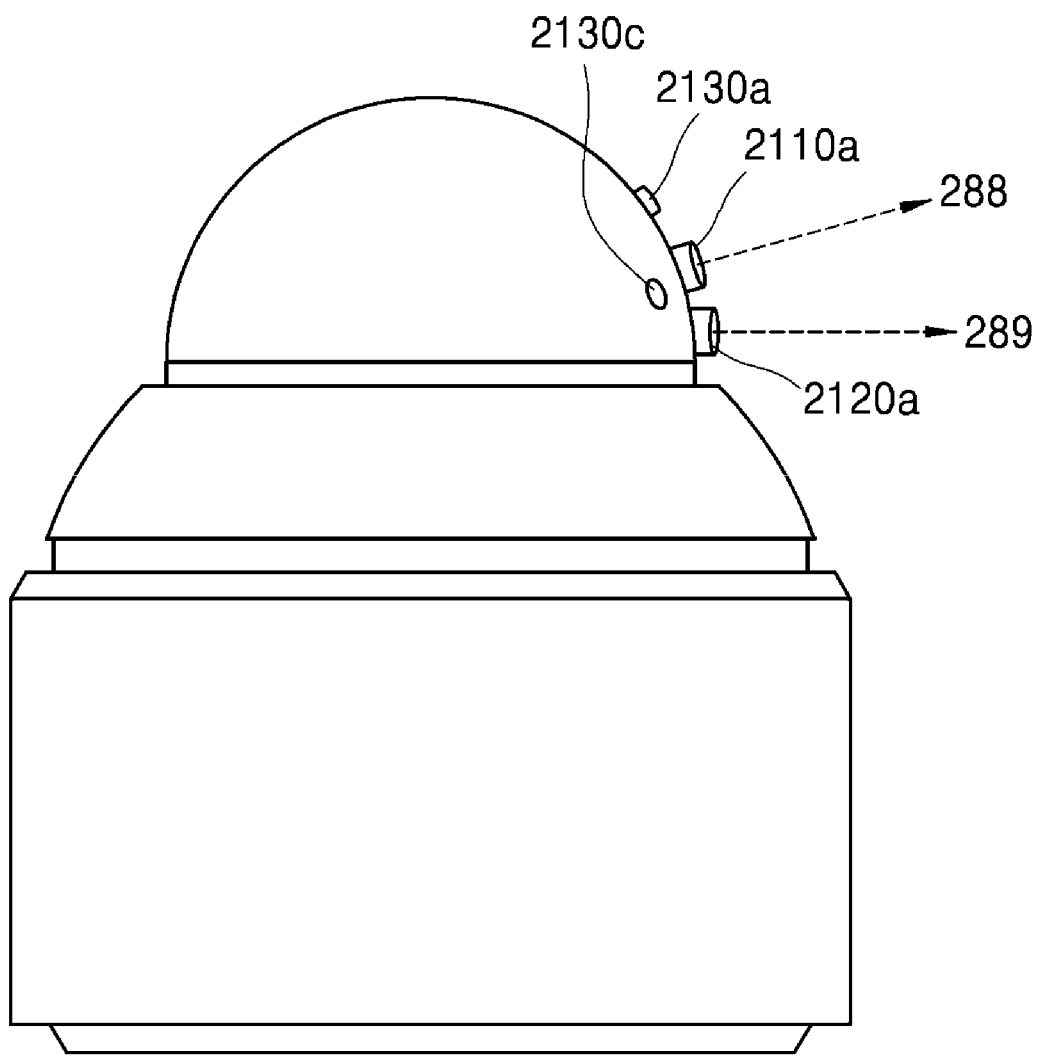
FIG. 28 and FIG. 29 illustrate a configuration in which an illuminance sensor is disposed on a robot according to one embodiment of the present disclosure.
Figure 29:
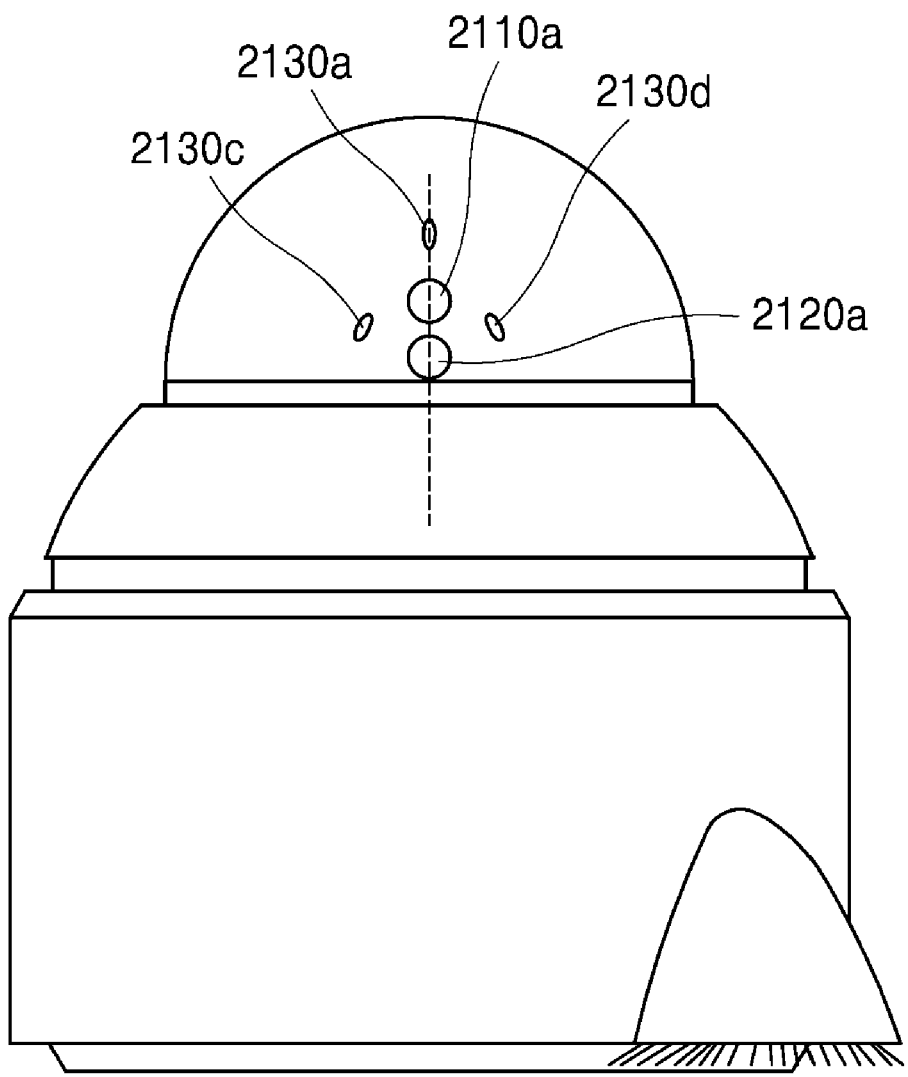

FIG. 28 and FIG. 29 illustrate a configuration in which an illuminance sensor is placed on a robot according to one embodiment of the present disclosure. FIG. 28 shows a side view of the robot. FIG. 29 shows a front view of the robot.

The robot 2000a has a depth camera 2110a, a vision camera 2120a, and an illuminance sensor 2130a mounted thereon. The illuminance sensor 2130a may be placed at a position on the robot at which the sensor 2130a may most accurately sense the brightness of the light in the direction in which the depth camera 2110a and the vision camera 2120a are to sense an image. Further, in order to increase the accuracy of sensing the illuminance, the illuminance sensors 2130c, 2130d may be distributed so as to identify the intensity of light in an upward or lateral direction other than the direction in which the depth camera 2110a and the vision camera 2120a are to sense an image. FIG. 29 shows a configuration (see a dotted line) in which the illuminance sensor 2130a, the depth camera 2110a, and the vision camera 2120a are arranged in the same vertical line, and a configuration in which the illuminance sensors 2130c and 2130d are spaced apart from left and right of cameras 2110a and 2120a which are arranged symmetrically around the vertical line. The illuminance sensors 2130c and 2130d may be arranged symmetrically around the vertical line and may be spaced apart from the vertical line in an angular spacing (for example, based on an entire left-right width of the robot). Referring to FIG. 28, 288 or 289 refers to a direction in which the camera senses an image. The illuminance sensors 2130c and 2130d may be arranged symmetrically around an extension line extending in the direction and may be spaced apart from the extension line in the angular spacing.

In another example, an illuminance sensor may be placed on a top of the robot. The illuminance sensor may be placed in positions that are not adjacent to the depth camera and the vision camera.

However, when plurality of illuminance sensors are disposed, the controller may assign each weight to each sensed illuminance value. For example, a high weight may be applied to an illuminance sensed by an illuminance sensor placed adjacent to the depth camera and the vision camera. To the contrary, a low weight may be applied to an illuminance sensed by an illuminance sensor placed far away from the depth camera and the vision camera. This may improve the sensing accuracy of the depth camera and the vision camera.

Further, when a direction in which the depth camera senses depth image (depth information) and a direction in which the vision camera senses vision image (color information) are different from each other, each of two or more illuminance sensors may be disposed in a corresponding manner to each of the two image sensing directions of the two cameras.

FIG. 30 illustrates a process for controlling an image control process according to an embodiment of the present disclosure. The sensing module 2100 may include a plurality of sensors which may include an ultrasonic sensor, an infrared sensor, and a lidar sensor. The controller 2900 compares a distance of an object sensed by each sensor with depth information or color information as generated by the depth camera 2110 or the vision camera 2120 S291.

When an error occurs from a result of the comparison S292, the controller identifies whether a cumulative value of errors is greater than or equal to a predefined value S294. When the cumulative value of the errors is greater than the predefined value, the controller 2900 may determine that an error occurred in generating the image information of the depth camera 2110 or the vision camera 2120 due to the brightness of the external light. Thus, the controller 90 may activate the image control process S296.

On the contrary, when no error occurs, the controller may reset the cumulative error value S293. When the cumulative error value is smaller than the predefined value S294, the cumulative error value is increased S295. The cumulative error value may increment by +1 when an error occurs within a predefined time interval. When the cumulative error value is 20, the controller 2900 may determine that an error has occurred for 20 seconds or greater and thus may trigger the image control process.

Further, in another embodiment of the present disclosure, in addition to the distance information of the object as detected, distance information calculated based on position information of the object stored in the map storage and position information of the robot may be used. For example, the controller 2900 identifies that a wall is located at a distance of 3 meters away from the robot in the map storage 2200. However, all of the depth values constituting the depth information sensed by the depth camera 2110 are larger than 3 meters. In this case, the controller may identify an error that the depth camera 2110 does not sense the wall. Similarly, as shown in FIG. 30, the controller 2900 may count an error occurrence and accumulate the error occurrences and then may trigger the image control process when the accumulated value exceeds a predefined level.

In accordance with the present disclosure, the illuminance sensor 2130 may be placed on the robot in a position in a corresponding manner to a position at which the depth camera 2110 or the vision camera 2120 is installed. The illuminance sensor 2130, and the depth camera 2110 or the vision camera 2120 may be arranged in a straight line or horizontally or in a vertical line or within a predefined angular range. When placing the illuminance sensor 2130 to face in the direction in which the depth camera 2110 or vision camera 2120 faces, this configuration may measure and reflect the influence of the external light currently applied to the camera installed on the robot.

Further, the controller 2900 combines and use the current time, season, position information, etc. with each other, in addition to the light intensity that the camera detects to determine whether the external light affecting currently the robot is strong light such as the sunlight and then determine whether to activate the image control process based on the determination result.

In accordance with the present disclosure, the robot or depth sensing module may distinguish, in the calculated depth information or color information, the distorted information due to external light, and the object that the robot or depth sensing module should avoid, such as an actual obstacle or person. Especially, the robot is not affected by the sun-light in all of large areas such as airports, schools, hospitals, terminals, train stations, complex malls, etc. For this reason, the robot analyzes the current position and time of the robot based on the entirety of the map that the robot possesses or is stored in the robot. Only when the robot is present in a place in which the robot is affected by the external light such as sun-light or strong lighting device, the robot may apply the filtering algorithm or image control algorithm such that the robot operates efficiently.

In the filtering process, a delay may occur due to a process of comparing current depth information with the previous depth information accumulated over previous frames. In this connection, the filtering may not be performed continuously but only when the robot is present in a predefined space, based on the information about the robot's current position and about the influence of the external light on the robot at the current position thereof. This may increase the speed of the data processing. Further, the filtering may be applied based on situation information about when the external light is strong or not as determined using the optical sensor 111.

When, as shown in FIG. 17, the robot 1000 travels in the same space repeatedly, the robot may accumulate and store information about the time-point or situation at which the external light occurs.

As shown in FIG. 30, the robot identifies whether the light affecting currently the robot is strong light, such as the sun light, and determines, based on the identification result, whether to activate the image control process.

In particular, in order to filter a value as recognized as actual data when light is reflected, information about the position of the lighting device, the position of the window, and the degree of light reflection from the walls and floors may be maintained to calculate the possibility of data distortion due to the external light. Based on the possibility, the filtering operation may be or may not be performed. Alternatively, based on the possibility, the controller may determine whether to activate the image control process including the filtering operation or selecting the feature set.

Although all components constituting an embodiment of the present disclosure are described as being combined into a single component or operating in a combined manner thereto, the present disclosure is not necessarily limited to this embodiment. Within the scope of the present disclosure, all components may be selectively combined into at least two components or operate in a combined manner thereto. Further, each of all of the components may be implemented in a single independent hardware. In another example, some or all of the components may be selectively combined to be implemented as a computer program having a program module that performs some or all of functions combined in one or a plurality of hardware. Codes and code segments constituting the computer program may be easily derived by those skilled in the art of the present disclosure. Such a computer program may be stored in a computer readable storage medium and may be read and executed by a computer, thereby to implement an embodiment of the present disclosure. The storage medium of the computer program includes a storage medium including a magnetic recording medium, an optical recording medium and a semiconductor recording element. Further, the computer program for implementing an embodiment of the present disclosure includes a program module transmitted in real time through an external device.

In the above description, the present disclosure has been described with reference to embodiments of the present disclosure. However, various changes and modifications may be made at a level of a knowledge of a skilled person to the art. Thus, it will be understood that such changes and

REFERENCE NUMERALS

| | |
|---|---|
| 100: Depth sensing module | 110: Depth camera |
| 120: Sensed-data filter | 140: Light information provider |
| 141 and 2200: Map storage | 145: Light-source period storage |
| 147: Context storage | 2181 to 2189: Sensors |
| 190: Object sensing module | 191: Lidar sensor |
| 192: Vision sensor | 195: Sensed-data analyzer |
| 2100: Sensing module | 300 and 2300: Driver |
| 2110: Depth camera | 2120: Vision camera |
| 2130: Illuminance sensor | 2150: Storage |
| 400 and 2400: Service-providing device | 500 and 2500: Communicator |
| 900 and 2900: Robot controller | 1000 and 2000: Robot |

What is claimed is:

1. A depth sensing module for a robot, the depth sensing module comprising:
storage configured to store depth information;
a depth camera configured to:
generate first depth information of an object at a first time-point, and
generate second depth information of the object at a second time-point, the second time-point being before or after the first time-point;
a sensed-data filter configured to:
compare the first depth information with the second depth information, and
identify a filtering target region in the second depth information based on comparing the first depth information with the second depth information; and
a controller configured to:
change a depth value of the filtering target region in the second depth information or remove the second depth information from the storage,
wherein when a change in continuously detected depth values is non-linear, the depth sensing module identifies the change in the continuously detected depth values as being due to an influence of external light and filters a corresponding depth value associated with the change in the continuously detected depth values.

2. The depth sensing module of claim 1, wherein the controller is further configured to:
apply third depth information to the filtering target region in the second depth information to generate updated second depth information or apply the first depth information to the filtering target region in the second depth information to generate updated second depth information, and the third depth information being obtained by applying a weight to the first depth information, and
store the updated second depth information as depth information corresponding to the second time-point into the storage.

3. The depth sensing module of claim 1, wherein the sensed-data filter is further configured to:
compare a first depth value of a first depth cell in the first depth information with a second depth value of a second depth cell in the second depth information, the second depth information also corresponding to the first depth cell, and
identify the filtering target region based on comparing the first depth value with the second depth value.

4. The depth sensing module of claim 3, wherein the sensed-data filter is further configured to:
in response to a difference between the first depth value and the second depth value being larger than a difference between a position of the depth sensing module at the first time-point and a position of the depth sensing module at the second time-point or in response to a difference between the first depth value and the second depth value being larger than a predefined reference value, set the second depth value of the second depth cell as a garbage value for nonuse, and
wherein the controller is further configured to:
generate a third depth value using the first depth value based on the difference between the position of the depth sensing module at the first time-point and the position of the depth sensing module at the second time-point, and
set the second depth value of the second depth cell as the third depth value.

5. The depth sensing module of claim 1, further comprising:
a light information provider configured to store characteristic information of external light at a current position of the depth sensing module,
wherein the controller is further configured to extract the characteristic information of the external light stored in the light information provider, and
wherein the sensed-data filter is further configured to identify the filtering target region based on the extracted characteristic information of the external light.

6. The depth sensing module of claim 5, wherein the light information provider includes:
map storage configured to store a position of a stationary object, and reflection or transmission information of the external light in a space, wherein the depth sensing module generates depth information in the space;
light-source period storage configured to store period information specifying time periods when the external light is turned on and off; and
context storage configured to store a context in which the external light is turned on and off.

7. A moving robot for sensing a depth of an object based on an effect of external light, the moving robot comprising:
a depth sensing module including:
storage configured to store depth information;
a depth camera configured to:
generate first depth information of an object at a first time-point, and
generate second depth information of the object at a second time-point, the second time-point being before or after the first time-point;
a sensed-data filter configured to:
compare the first depth information with the second depth information, and
identify a filtering target region in the second depth information based on comparing the first depth information with the second depth information;
a controller configured to:
change a depth value of the filtering target region in the second depth information or remove the second depth information from the storage;
an object sensing module configured to sense an object around the moving robot;
a driver configured to move the moving robot; and
a robot controller configured to:

identify the object around the moving robot based on sensing results received from the depth sensing module and the object sensing module, and control a travel route of the moving robot based on identification of the object identified by the robot controller, wherein when a change in continuously detected depth values is non-linear, the depth sensing module identifies the change in the continuously detected depth values as being due to an influence of the external light and filters a corresponding depth value associated with the change in the continuously detected depth values.

8. The moving robot of claim 7, wherein the depth sensing module or the moving robot further includes:

a light information provider configured to store characteristic information of external light at a current position of the depth sensing module, wherein the controller is further configured to extract the characteristic information of the external light stored in the light information provider, and wherein the sensed-data filter is further configured to identify the filtering target region based on the characteristic information of the external light extracted from the light information provider.

9. The moving robot of claim 8, wherein the light information provider includes:

map storage configured to store a position of a stationary object, and reflection or transmission information of the external light in a space, wherein the depth sensing module generates depth information in the space;

light-source period storage configured to store period information specifying time periods when the external light is turned on and off; and context storage configured to store a context in which the external light is turned on and off.

10. The moving robot of claim 8, wherein the depth sensing module or the moving robot further includes an optical sensor, and wherein the robot controller is further configured to:

in response to an intensity of the external light or an on-off time-point of the external light sensed by the optical sensor, while the moving robot travels, being different from the characteristic information of the external light stored in the light information provider, change an intensity or an on-off time-point of external light to generate an adjusted intensity or an adjusted on-off time-point of external light, and store the adjusted intensity or the adjusted on-off time-point of external light in the light information provider.

* * * * *